United States Patent
Krishnan et al.

(10) Patent No.: US 12,405,962 B2
(45) Date of Patent: Sep. 2, 2025

(54) SYSTEM AND METHOD FOR CUSTOMIZATION IN AN ANALYTIC APPLICATIONS ENVIRONMENT

(71) Applicant: ORACLE INTERNATIONAL CORPORATION, Redwood Shores, CA (US)

(72) Inventors: Balaji Krishnan, Fremont, CA (US); Matthew Bedin, Denver, CO (US); Saurabh Verma, Cupertino, CA (US); Ananth Venkata, San Ramon, CA (US); Joseph Kuttikat, Bengaluru (IN); Pavan Ananthamurthy, Bengaluru (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/868,081

(22) Filed: May 6, 2020

(65) Prior Publication Data

US 2020/0356575 A1    Nov. 12, 2020

Related U.S. Application Data

(60) Provisional application No. 62/844,004, filed on May 6, 2019.

(51) Int. Cl.
    G06F 16/25    (2019.01)
    G06F 8/65     (2018.01)

(52) U.S. Cl.
    CPC .............. *G06F 16/254* (2019.01); *G06F 8/65* (2013.01)

(58) Field of Classification Search
    CPC .... G06F 16/254; G06F 16/211; G06F 16/213; G06F 8/65; G06F 9/50
    See application file for complete search history.

(56) References Cited

U.S. PATENT DOCUMENTS 7,058,615 B2   6/2006   Yao
7,739,292 B2   6/2010   Falk
               (Continued)

FOREIGN PATENT DOCUMENTS

CN    101971176    2/2011
CN    105900059    8/2016
              (Continued)

OTHER PUBLICATIONS

International Search Report and the Written Opinion of the International Searching Authority mailed Jul. 21, 2020 for PCT Application No. PCT/US2020/031572, 11 pages.

(Continued)

*Primary Examiner* — Charles D Adams
(74) *Attorney, Agent, or Firm* — TUCKER ELLIS LLP

(57) ABSTRACT

In accordance with an embodiment, described herein is a system and method for providing support for extensibility and customization in an analytic applications environment. An extract, transform, load (ETL) or other data pipeline or process provided by the analytic applications environment, can operate in accordance with an analytic applications schema and/or a customer schema associated with a customer (tenant), to receive data from the customer's enterprise software application or data environment, for loading into a data warehouse instance. A semantic layer enables the use of custom semantic extensions to extend a semantic model, and provide custom content at a presentation layer. Extension wizards or development environments can guide users in using the custom semantic extensions to extend or customize the semantic model, through a definition of branches and steps, followed by promotion of the extended or customized semantic model to a production environment.

13 Claims, 20 Drawing Sheets

(56) References Cited

U.S. PATENT DOCUMENTS

| | | | |
|---|---|---|---|
| 8,799,209 | B2 | 8/2014 | Bakalash |
| 8,805,971 | B1 | 8/2014 | Roth |
| 9,075,860 | B2 | 7/2015 | Kozina |
| 9,294,482 | B2 | 3/2016 | Mellor |
| 9,355,145 | B2 | 5/2016 | George |
| 9,442,993 | B2 | 9/2016 | Tung |
| 9,509,571 | B1* | 11/2016 | Liu .................. H04L 41/5045 |
| 9,619,535 | B1 | 4/2017 | Kapoor |
| 9,961,011 | B2 | 5/2018 | Mordani |
| 9,990,383 | B2 | 6/2018 | Brinnand |
| 10,110,390 | B1 | 10/2018 | Nguyen |
| 10,324,932 | B2 | 6/2019 | Gordon |
| 10,572,679 | B2 | 2/2020 | Frank |
| 10,614,091 | B1 | 4/2020 | Kapoor |
| 10,628,594 | B2 | 4/2020 | Himmel |
| 10,685,034 | B2 | 6/2020 | Shi |
| 10,866,938 | B2 | 12/2020 | Gutpa |
| 10,997,129 | B1 | 5/2021 | Nanda |
| 11,138,164 | B1 | 10/2021 | Munuhur |
| 11,190,599 | B2 | 11/2021 | Greenstein |
| 11,194,795 | B2 | 12/2021 | Muralidhar |
| 11,250,344 | B2 | 2/2022 | Maurya |
| 11,349,917 | B2 | 5/2022 | Jennings |
| 11,609,904 | B2 | 3/2023 | Ananthamurthy |
| 11,646,975 | B2 | 5/2023 | Rushton |
| 2004/0215584 | A1 | 10/2004 | Yao |
| 2007/0073712 | A1 | 3/2007 | Falk |
| 2008/0162509 | A1 | 7/2008 | Becker |
| 2009/0248739 | A1 | 10/2009 | Cao |
| 2009/0281865 | A1 | 11/2009 | Stoitsev |
| 2010/0161648 | A1* | 6/2010 | Eberlein .......... G06F 16/24573<br>707/769 |
| 2011/0295793 | A1* | 12/2011 | Venkatasubramanian ...................<br>G06F 16/283<br>707/602 |
| 2012/0089564 | A1 | 4/2012 | Bakalash |
| 2012/0191642 | A1 | 7/2012 | George |
| 2012/0310875 | A1 | 12/2012 | Prahlad |
| 2013/0086134 | A1* | 4/2013 | Doughan .................. G06F 8/61<br>707/827 |
| 2014/0075032 | A1 | 3/2014 | Vasudevan et al. |
| 2014/0114907 | A1 | 4/2014 | Kozina |
| 2014/0149180 | A1 | 5/2014 | Yaseen |
| 2014/0229511 | A1 | 8/2014 | Tung |
| 2015/0033217 | A1 | 1/2015 | Mellor |
| 2015/0088807 | A1 | 3/2015 | Toppin |
| 2015/0207758 | A1 | 7/2015 | Mordani |
| 2016/0224803 | A1 | 8/2016 | Frank |
| 2016/0292192 | A1* | 10/2016 | Bhagat .................. G06F 16/258 |
| 2016/0321308 | A1 | 11/2016 | Brinnand |
| 2016/0328566 | A1 | 11/2016 | Nellamakkada |
| 2017/0116295 | A1 | 4/2017 | Wan et al. |
| 2017/0249361 | A1 | 8/2017 | Gordon |
| 2018/0012145 | A1 | 1/2018 | Maurya |
| 2018/0032550 | A1* | 2/2018 | Gupta ................. G06F 21/6218 |
| 2018/0039921 | A1 | 2/2018 | Mos |
| 2018/0052898 | A1* | 2/2018 | Allan .................. G06F 16/254 |
| 2018/0211051 | A1 | 7/2018 | Himmel |
| 2019/0114350 | A1 | 4/2019 | Shi |
| 2020/0007556 | A1 | 1/2020 | Brebner |
| 2020/0007631 | A1 | 1/2020 | Greenstein |
| 2020/0334240 | A1 | 10/2020 | Muralidhar |
| 2021/0044540 | A1 | 2/2021 | Rushton |
| 2022/0030062 | A1 | 1/2022 | Jennings |
| 2022/0067511 | A1 | 3/2022 | Goldman-Shenhar |
| 2022/0100748 | A1 | 3/2022 | Ananthamurthy |
| 2022/0100749 | A1 | 3/2022 | Kuttikat |
| 2022/0100778 | A1 | 3/2022 | Krishnan |

FOREIGN PATENT DOCUMENTS

| | | |
|---|---|---|
| CN | 107015794 | 8/2017 |
| CN | 108701256 | 10/2018 |
| JP | 2003529119 | 9/2003 |
| JP | 2009146350 | 7/2009 |

OTHER PUBLICATIONS

United States Patent and Trademark Office, Notice of Allowance and Fee(s) due dated Jul. 26, 2023 for U.S. Appl. No. 16/851,869, 9 pages.

European Patent Office, International Searching Authority, Notification of Transmittal of the International Search Report and the Written Opinion of the International Searching Authority, or the Declaration dated Jan. 18, 2022 for International Application No. PCT/US2021/051588, 15 pages.

European Patent Office, International Searching Authority, Notification of Transmittal of the International Search Report and the Written Opinion of the International Searching Authority, or the Declaration dated Jan. 18, 2022 for International Application No. PCT/US2021/051589, 14 pages.

United States Patent and Trademark Office, Office Communication dated Oct. 6, 2022 for U.S. Appl. No. 17/376,890, 6 pages.

United States Patent and Trademark Office, Notice of Allowance and Fee(s) Due dated Feb. 8, 2023 for U.S. Appl. No. 17/376,890, 10 pages.

United States Patent and Trademark Office, Office Communication dated Jul. 22, 2022 for U.S. Appl. No. 17/376,895, 10 pages.

United States Patent and Trademark Office, Office Communication dated Jul. 11, 2022 for U.S. Appl. No. 17/376,903, 11 pages.

United States Patent and Trademark Office, Office Communication dated Apr. 27, 2023 for U.S. Appl. No. 17/376,895, 12 pages.

United States Patent and Trademark Office, Office Communication dated Apr. 13, 2023 for U.S. Appl. No. 17/376,903, 13 pages.

United States Patent and Trademark Office, Office Communication dated Oct. 5, 2023 for U.S. Appl. No. 17/180,385, 16 pages.

United States Patent and Trademark Office, Office Communication dated Sep. 15, 2023 for U.S. Appl. No. 17/883,471, 6 pages.

European Patent Office, Communication pursuant to Article 94(3) EPC dated Oct. 18, 2023 for European Patent Application No. 21712313.2, 7 pages.

Oracle, "Creating a Repository Using the Oracle BI Administration Tool (12.2.1.0.0)" Copyright © 2015, retrieved on Dec. 1, 2023 from: <https://web.archive.org/web/20151030024408/https://www.oracle.com/webfolder/technetwork/tutorials/obe/fmw/bi/bi1221/rpd/rpd.html>.

United States Patent and Trademark Office, Office Communication dated Aug. 23, 2023 for U.S. Appl. No. 16/920,574, 16 pages.

Ramesh, S. M. and Gomathy, B. "Review on Scheduling Algorithms for Data Warehousing" International Journal of Science and Research (IJSR), vol. 3 Issue 9, Sep. 2014, 6 pages.

United States Patent and Trademark Office, Office Communication dated Nov. 7, 2023 for U.S. Appl. No. 18/137,306, 20 pages.

United States Patent and Trademark Office, Notice of Allowance and Fee(s) Due dated Jul. 30, 2024 for U.S. Appl. No. 17/180,385, 8 pages. Reason(s) for Refusal dated Jul. 24, 2024 for Japanese Patent Application.

Japan Patent Office, Final Notification of No. 2021-551956, 8 pages. Intellectual Property India, Examination report under sections 12 & 13 of the Patents Act, 1970 and the Patents Rules, 2003 dated Feb. 15, 2024 for India Patent Application No. 202147017548, 7 pages.

European Patent Office, Communication pursuant to Article 94(3) EPC dated January 3, 20214 for European Patent Application No. 20728321.9, 9 pages.

Japan Patent Office, Notice of Reasons for Refusal dated Mar. 15, 2024 for Japanese Patent Application No. 2021-551956, 8 pages.

Japan Patent Office, Notice of Reasons for Refusal dated Jun. 13, 2024 for Japanese Patent Application No. 2021-551582, 12 pages.

Japan Patent Office, Notice of Reasons for Refusal dated Jun. 12, 2024 for Japanese Patent Application No. 2021-551572, 6 pages.

(56) References Cited

OTHER PUBLICATIONS

United States Patent and Trademark Office, Office Communication dated Jul. 1, 2024 for U.S. Appl. No. 17/076,164, 28 pages.

China National Intellectual Property Administration, Notification of Second Office Action dated Dec. 6, 2024 for Chinese Patent Application No. 202080006154.5, 12 pages.

United States Patent and Trademark Office, Notice of Allowance and Fee(s) Due dated Dec. 5, 2024 for U.S. Appl. No. 17/180,385, 5 pages.

China National Intellectual Property Administration, Notification of the First Office Action dated Sep. 24, 2024 for Chinese Patent Application No. 202080006154.5, 11 pages.

China National Intellectual Property Administration, Notification of Grant dated Feb. 21, 2025 for Chinese Patent Application No. 202080006154.5, 2 pages.

* cited by examiner

SYSTEM AND METHOD FOR CUSTOMIZATION IN AN ANALYTIC APPLICATIONS ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Patent Application titled "SYSTEM AND METHOD FOR CUSTOMIZATION IN AN APPLICATION ANALYTICS ENVIRONMENT", Application No. 62/844,004, filed May 6, 2019; which application is herein incorporated by reference.

TECHNICAL FIELD

Embodiments described herein are generally related to computer data analytics, and computer-based methods of providing business intelligence data, and are particularly related to systems and methods for providing support for extensibility and customization in an analytic applications environment.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

However, different customers of a data analytics environment may have different requirements with regard to how their data is classified, aggregated, or transformed, for purposes of providing data analytics or business intelligence data, or developing software analytic applications.

SUMMARY

In accordance with an embodiment, described herein is a system and method for providing support for extensibility and customization in an analytic applications environment. An extract, transform, load (ETL) or other data pipeline or process provided by the analytic applications environment, can operate in accordance with an analytic applications schema and/or a customer schema associated with a customer (tenant), to receive data from the customer's enterprise software application or data environment, for loading into a data warehouse instance. A semantic layer enables the use of custom semantic extensions to extend a semantic model, and provide custom content at a presentation layer. Extension wizards or development environments can guide users in using the custom semantic extensions to extend or customize the semantic model, through a definition of branches and steps, followed by promotion of the extended or customized semantic model to a production environment.

DETAILED DESCRIPTION

Figure 1:
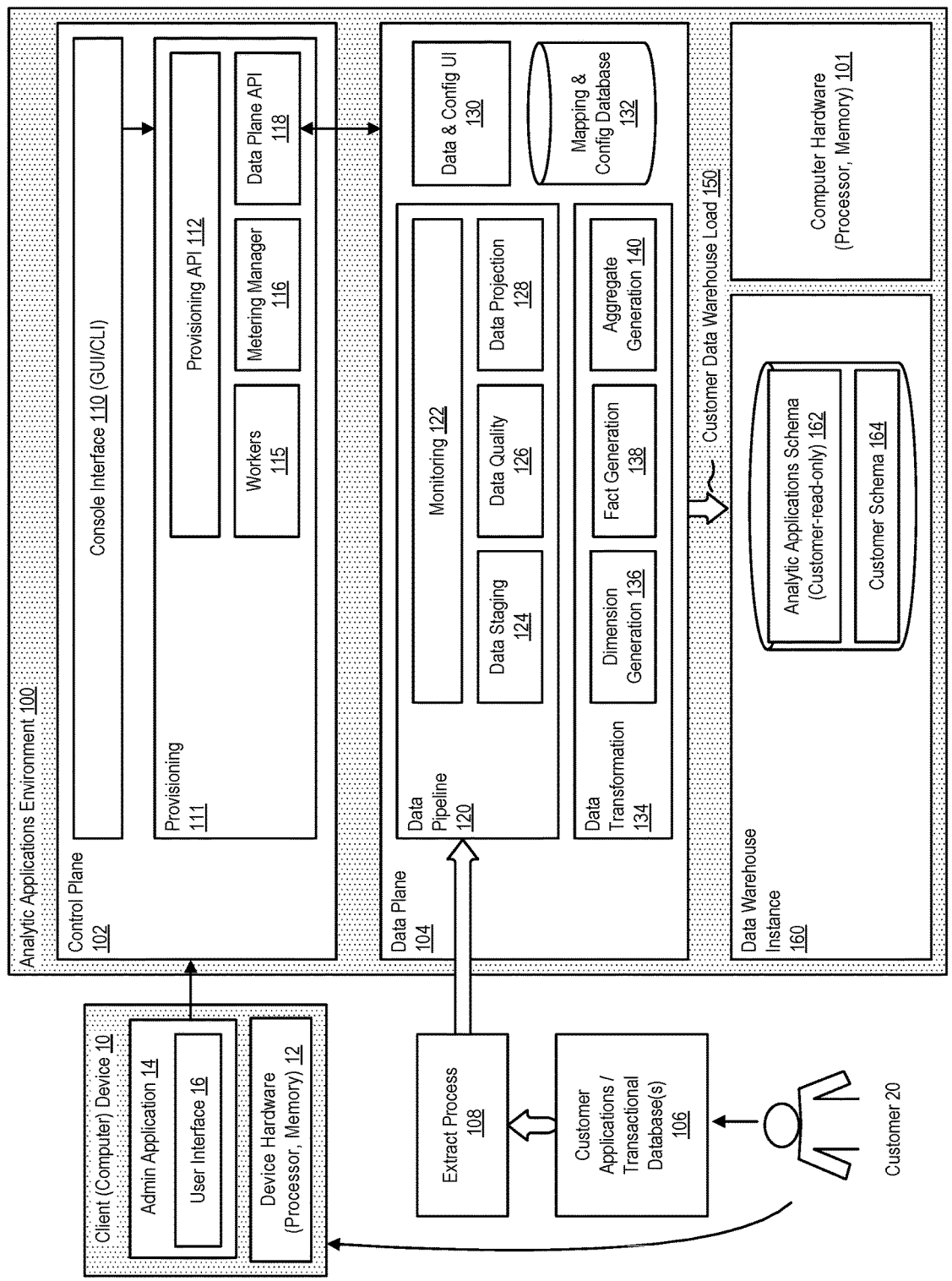
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

In accordance with an embodiment, a data pipeline or process, such as, for example, an extract, transform, load process, can operate in accordance with an analytic applications schema adapted to address particular analytics use cases or best practices, to receive data from a customer's (tenant's) enterprise software application or data environment, for loading into a data warehouse instance.

In accordance with an embodiment, each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

In accordance with an embodiment, a technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases can include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example, an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse environment or component, such as, for example, an Oracle Autonomous Data Warehouse (ADVV), Oracle Autonomous Data Warehouse Cloud (ADWC), or other type of data warehouse environment or component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an, e.g., ADWC, tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

Introduction

In accordance with an embodiment, a data warehouse environment or component, such as, for example, an Oracle Autonomous Data Warehouse (ADW), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example, an Oracle Business Intelligence Applications (OBIA) environment, or other type of BI component adapted to examine large amounts of data sourced either by the customer (tenant) itself, or from multiple third-party entities.

For example, in accordance with an embodiment, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, in accordance with an embodiment, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, in accordance with an embodiment, the analytic applications environment can be used to pre-populate a reporting interface of a data warehouse instance with relevant metadata describing business-related data objects in the context of various business productivity software applications, for example, to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

In accordance with an embodiment, the components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example, an Oracle Analytics Cloud or Oracle Cloud Infrastructure environment, or other type of cloud environment.

For example, in accordance with an embodiment, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, in accordance with an embodiment, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, in accordance with an embodiment, the provisioning component can be accessed and utilized, via the console interface, by a customer (tenant) to purchase one or more of a suite of business productivity software applications, together with a data warehouse instance for use with those software applications.

In accordance with an embodiment, a customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane.

For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

In accordance with an embodiment, to support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, in accordance with an embodiment, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
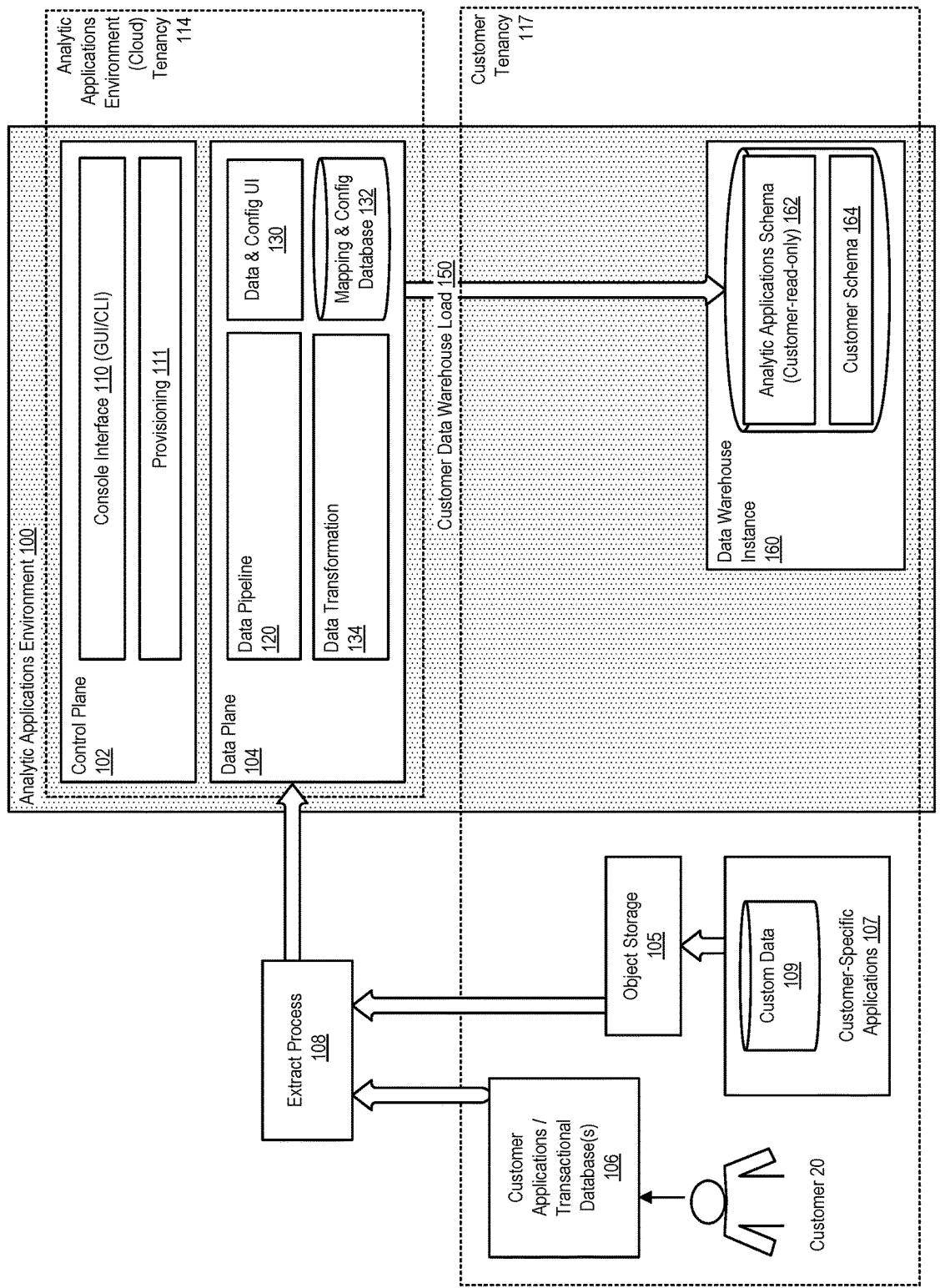
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
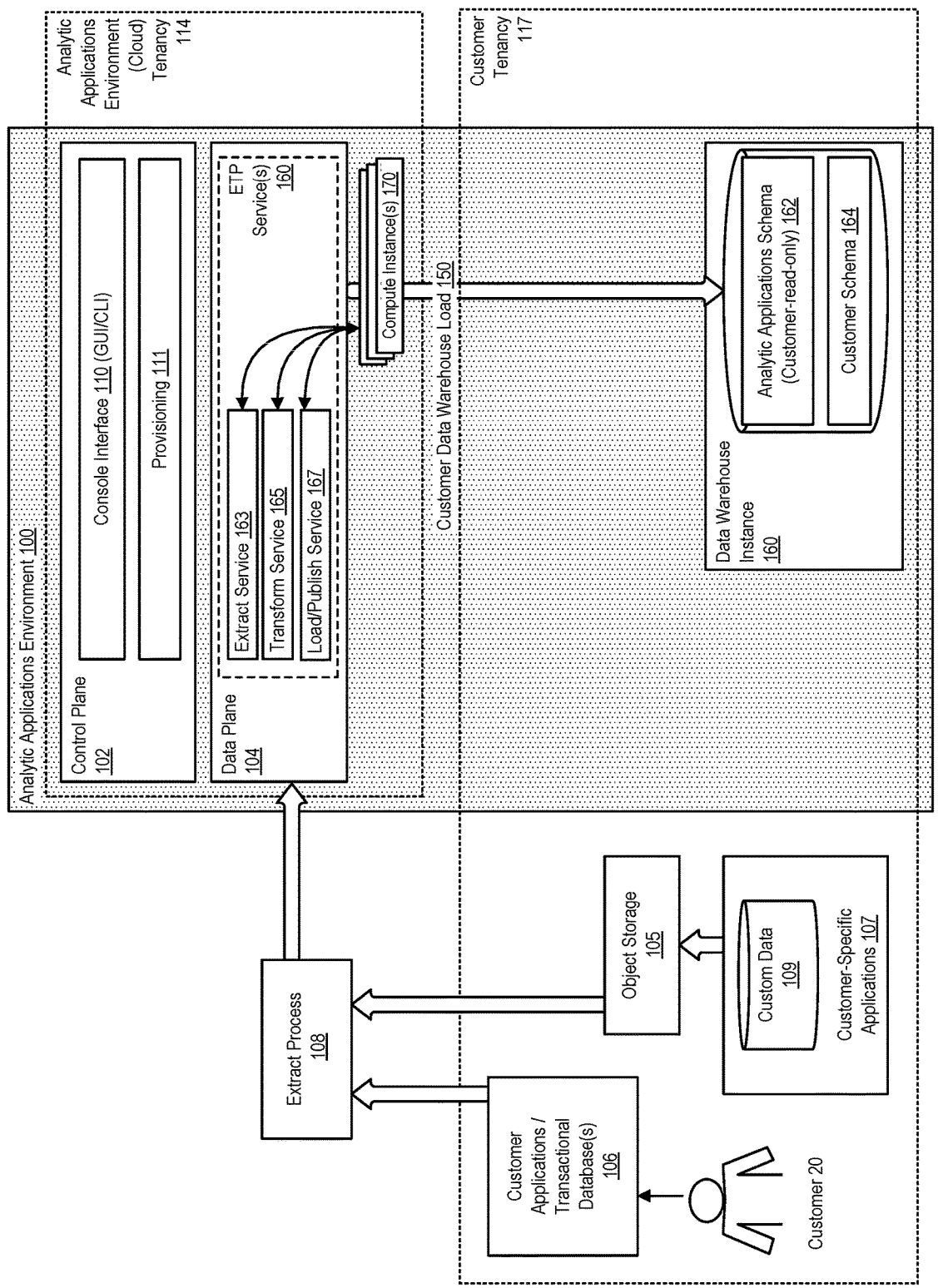
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, such as, for example, an Oracle Storage Service (OSS) component, for storage of the data.

Transformation: In accordance with an embodiment, the transformation process takes the data files from object storage component (e.g., OSS), and applies a business logic while loading them to a target data warehouse, e.g., an ADWC database, which is internal to the data pipeline or process, and is not exposed to the customer (tenant).

Load/Publish: In accordance with an embodiment, a load/publish service or process takes the data from the, e.g., ADWC database or warehouse, and publishes it to a data warehouse instance that is accessible to the customer (tenant).

Multiple Customers (Tenants)

Figure 4:
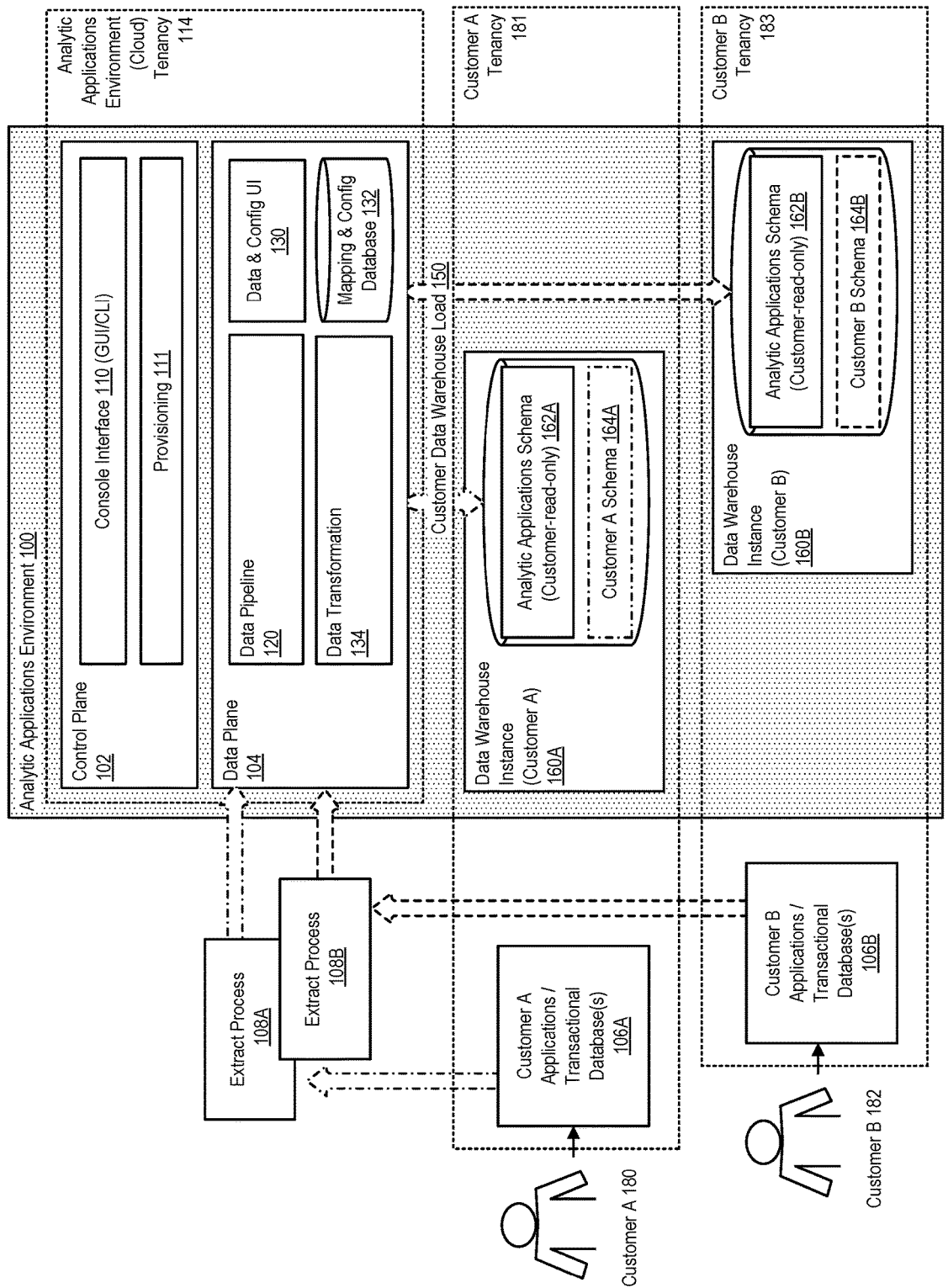
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

In accordance with an embodiment, for each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
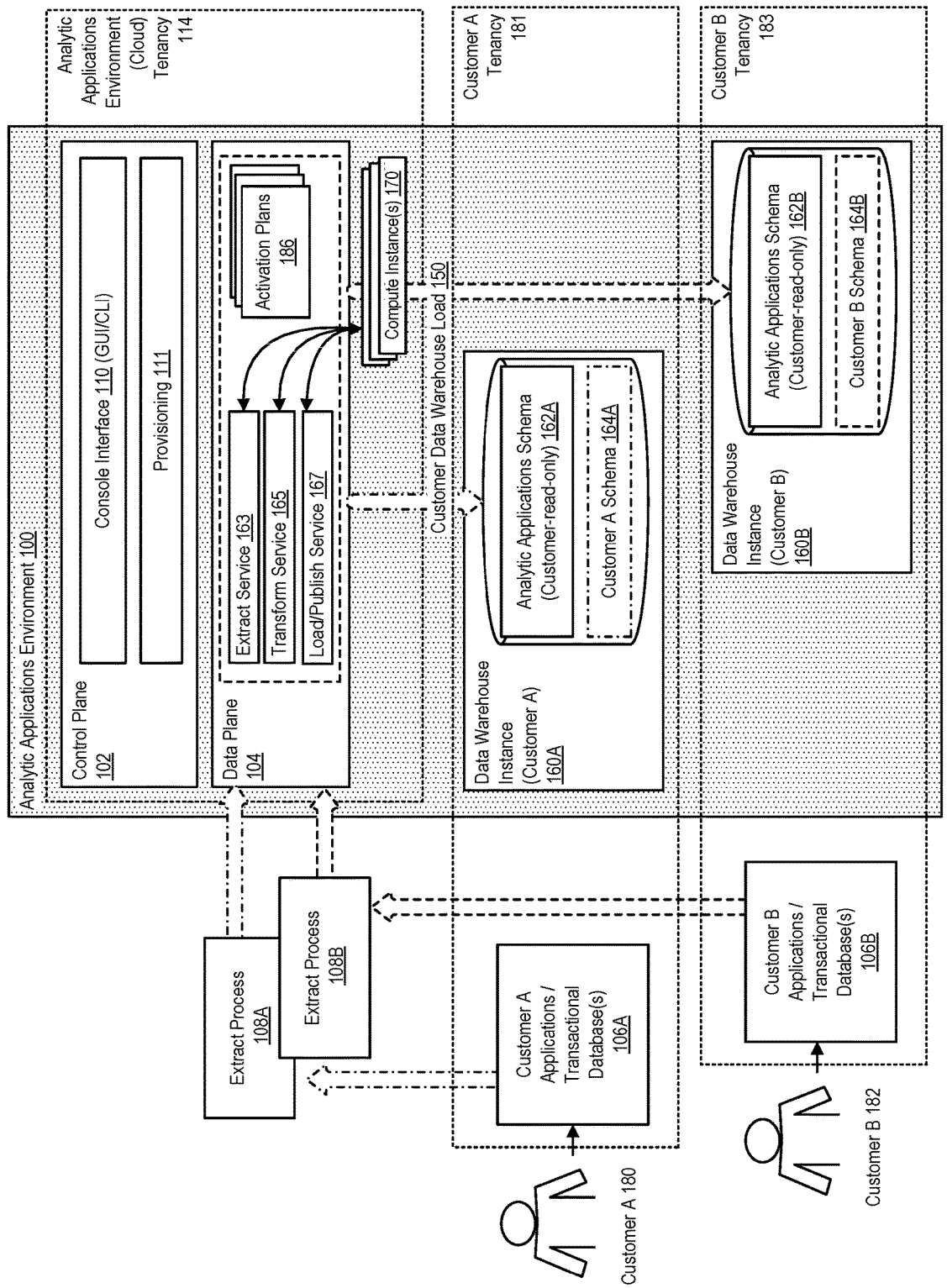
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VMs and service level agreements (SLAs) for those tenants. Such historical data can include statistics of load volumes and load times.

For example, in accordance with an embodiment, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETLs) based upon historical data can be automatic.

ETL Process Flow

Figure 6:
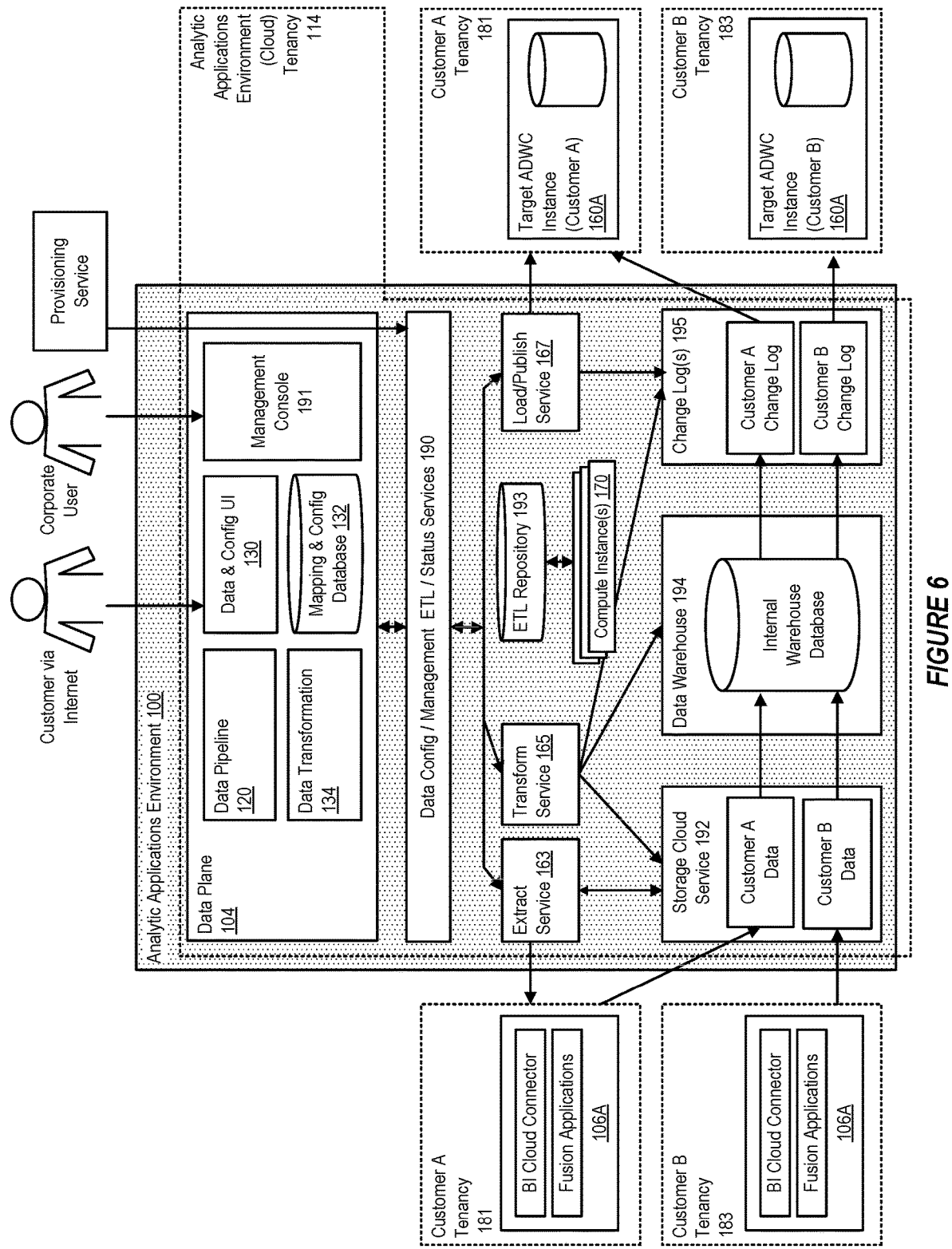
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management/ETL//status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., an ADWC database) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
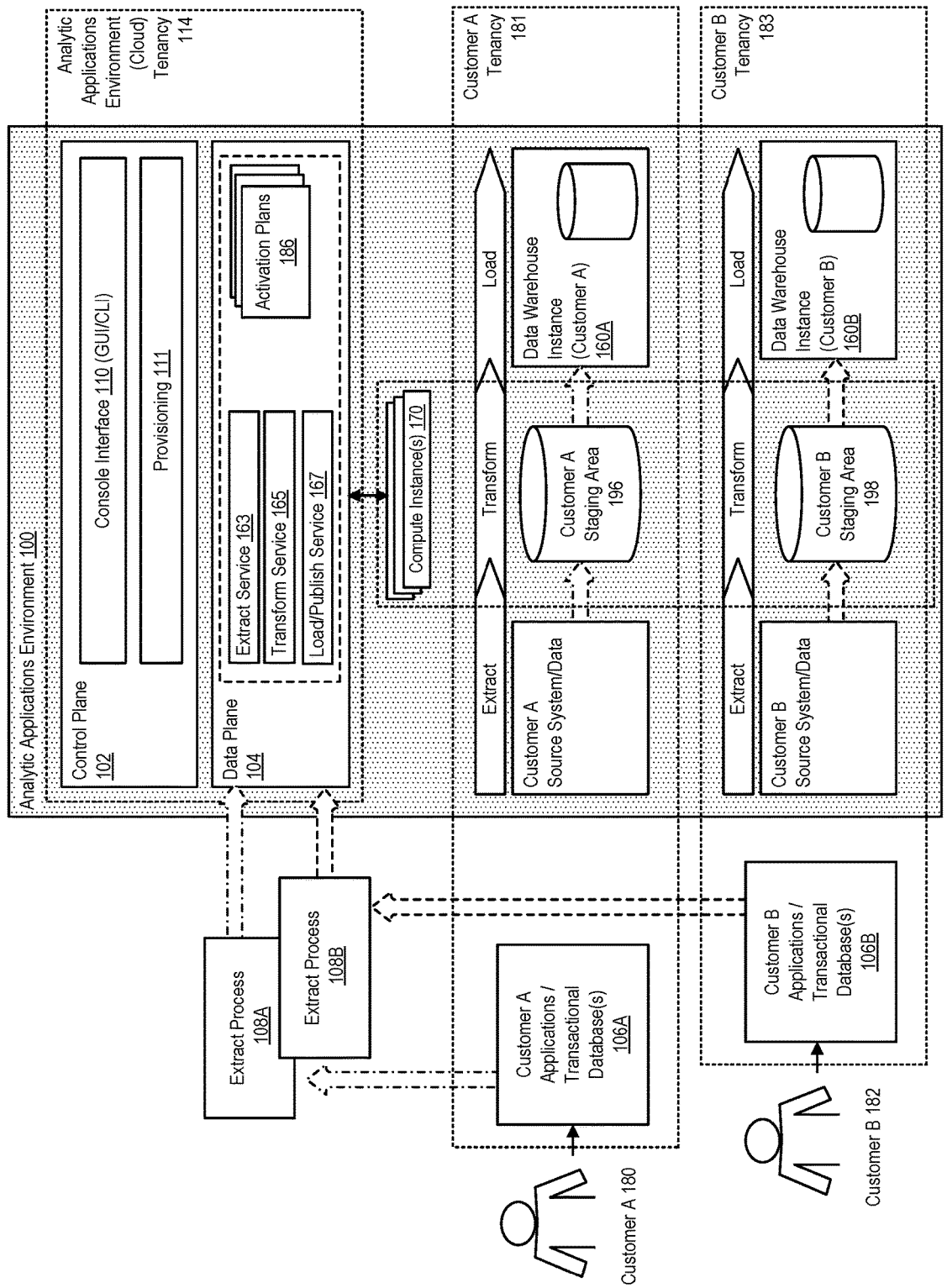
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
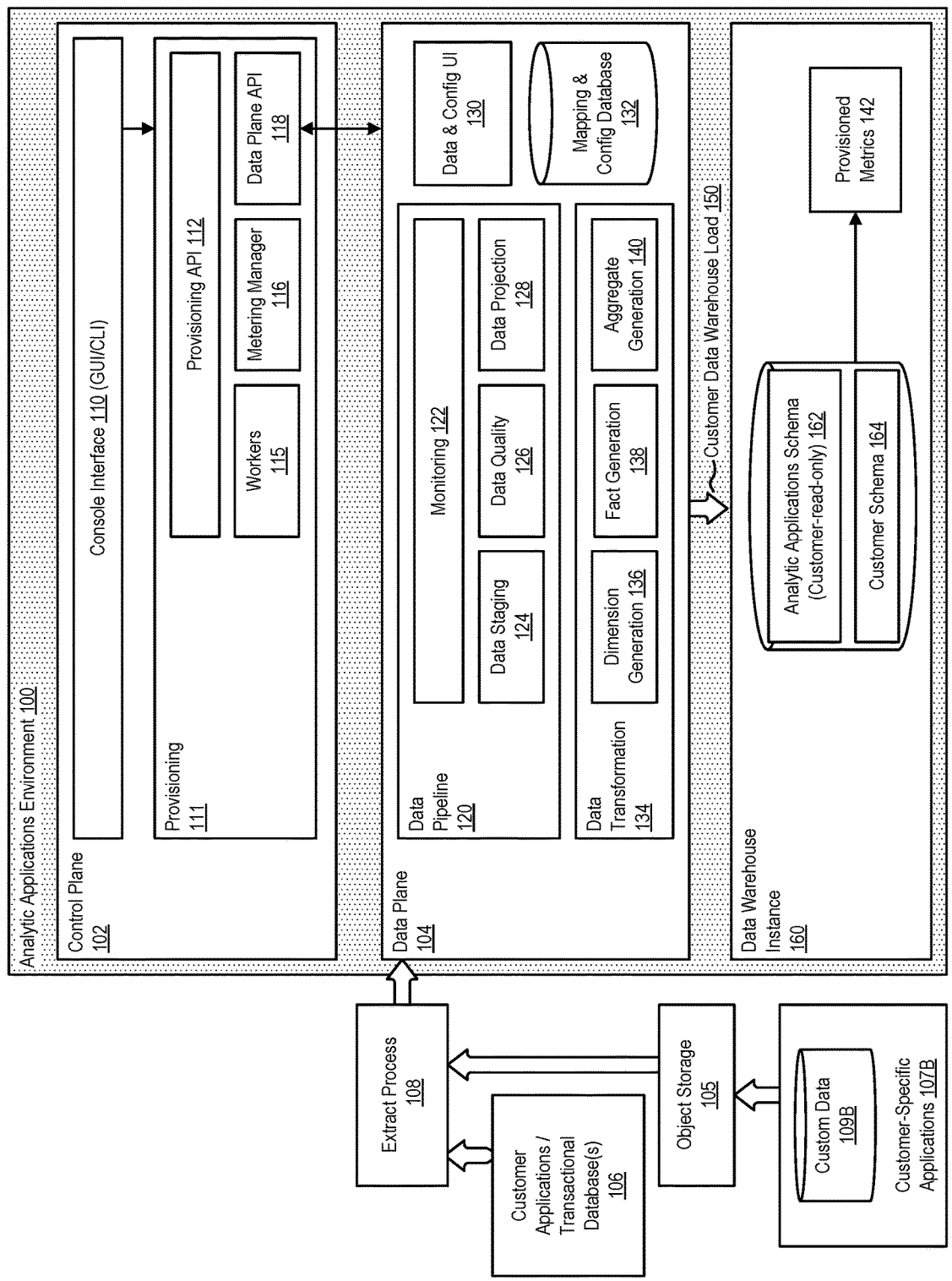
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
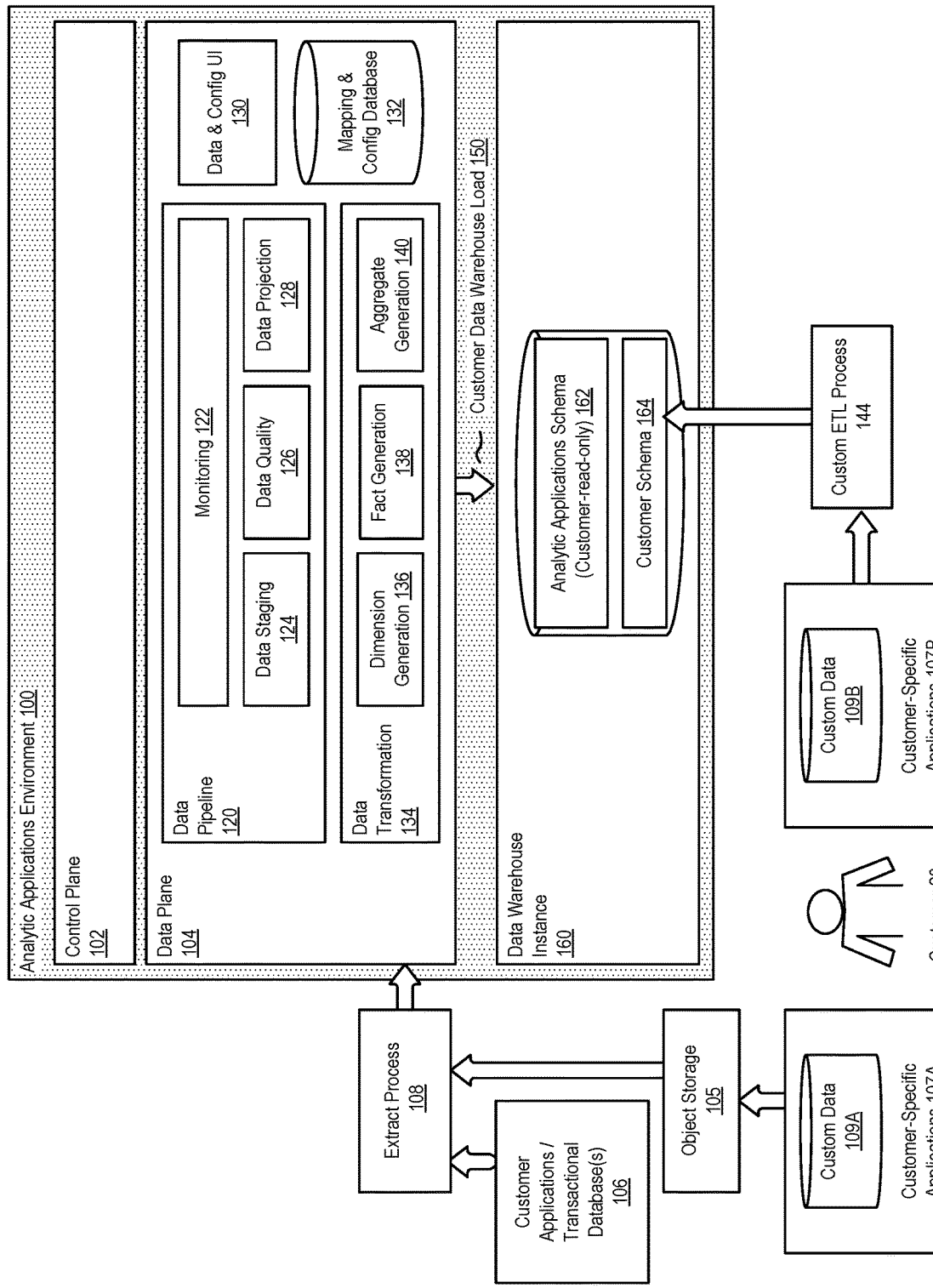
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic application schema; and can query their data warehouse instance using an interface provided, for example, by a business productivity and analytics product suite, or by a SQL tool of the customer's choice.

Analytic Applications Environment Method

Figure 10:
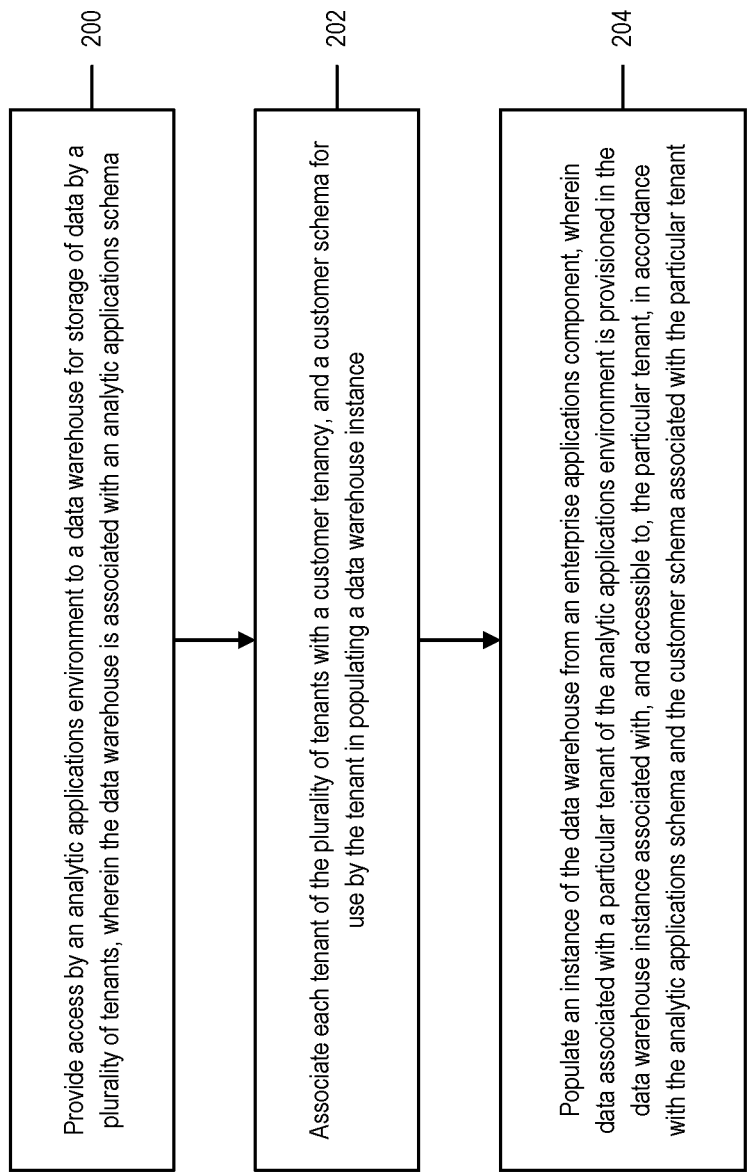
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202, each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

Extensibility and Customization

Different customers of a data analytics environment may have different requirements with regard to how their data is classified, aggregated, or transformed, for purposes of providing data analytics or business intelligence data, or developing software analytic applications.

in accordance with an embodiment, to support such different requirements, the system can include a semantic layer that enables the use of custom semantic extensions to extend a semantic data model (semantic model), and provide custom content at a presentation layer. Extension wizards or development environments can guide users in using the custom semantic extensions to extend or customize the semantic model, through a definition of branches and steps, followed by promotion of the extended or customized semantic model to a production environment.

In accordance with various embodiments, technical advantages of the described approach include support for additional types of data sources. For example, a user can perform data analytics based on a combination of ERP data sourced from a first vendor's product and HCM data sourced from a second, different vendor's product; or based on a combination of data received from multiple data sources having different regulatory requirements. A user's defined extensions or customizations can endure patches, updates, or other changes to the underlying system.

Figure 11:
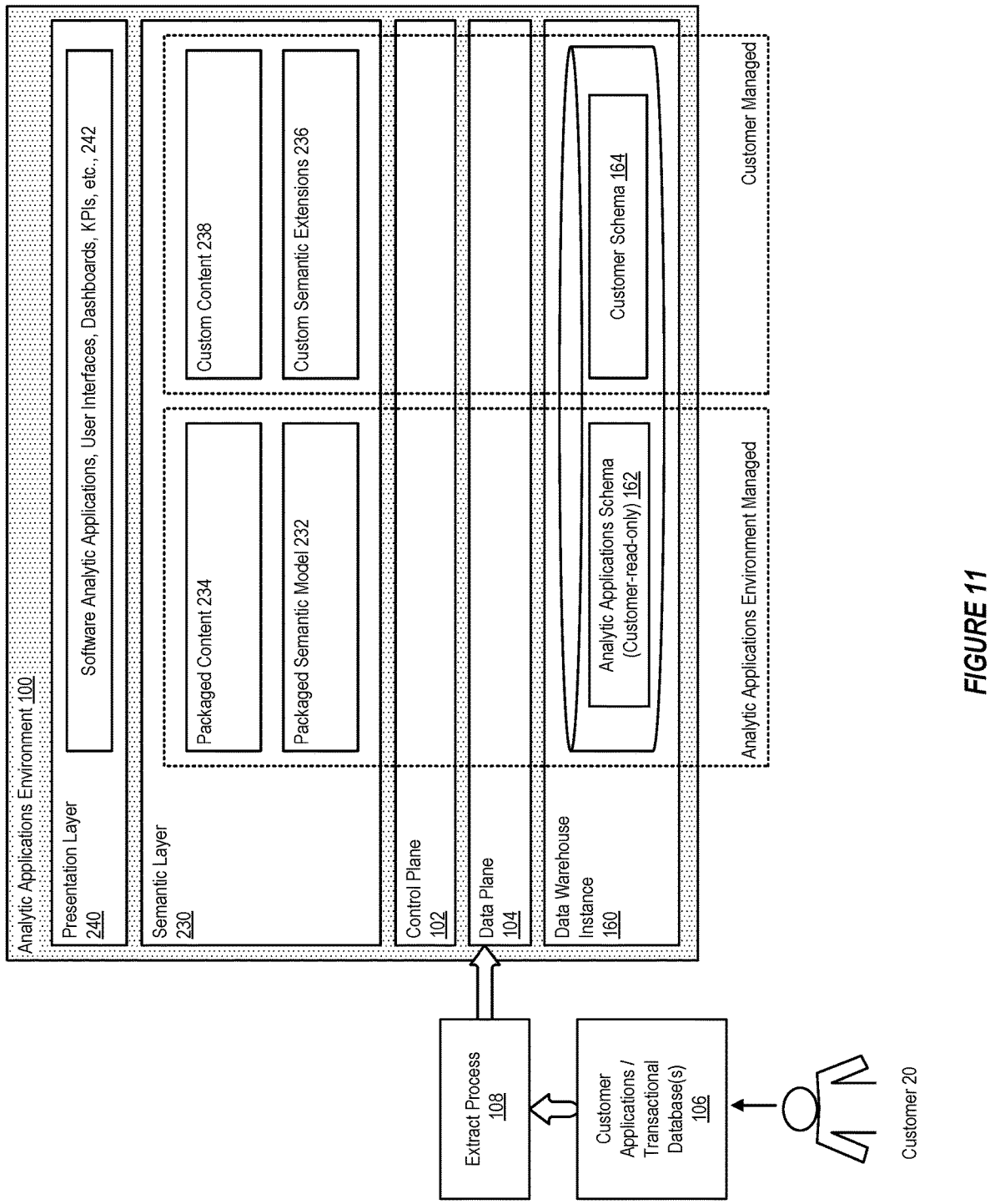
FIG. 11 illustrates an analytic applications environment that enables extensibility and customization, in accordance with an embodiment.

FIG. 11 illustrates a system for supporting extensibility and customization in an analytic applications environment, in accordance with an embodiment.

In accordance with an embodiment, a semantic layer can include data defining a semantic model of a customer's data; which is useful in assisting users in understanding and accessing that data using commonly-understood business terms. A semantic layer can include a physical layer that maps to a physical data model or data plane; a logical layer that operates as a mapping or transformation layer where calculations can be defined; and a presentation layer that enables a user to access the data as content.

As illustrated in FIG. 11, in accordance with an embodiment, the semantic layer 230 can include a packaged (out-of-the-box, initial) semantic model 232 that can be used to provide a packaged content 234. For example, the system can use an ETL or other data pipeline or process as described above, to load data from a customer's enterprise software application or data environment into a data warehouse instance, wherein the packaged semantic model can then be used to provide packaged content to the presentation layer.

In accordance with an embodiment, the semantic layer can also be associated with one or more semantic extensions 236 that can be used to extend the packaged semantic model, and provide custom content 238 to the presentation layer 240.

In accordance with an embodiment, the presentation layer can enable access to the data content using, for example, a software analytic application, user interface, dashboard, key performance indicators (KPI's) 242; or other type of report or interface as may be provided by products such as, for example, Oracle Analytics Cloud, or Oracle Analytics for Applications.

Branches and Steps

Figure 12:
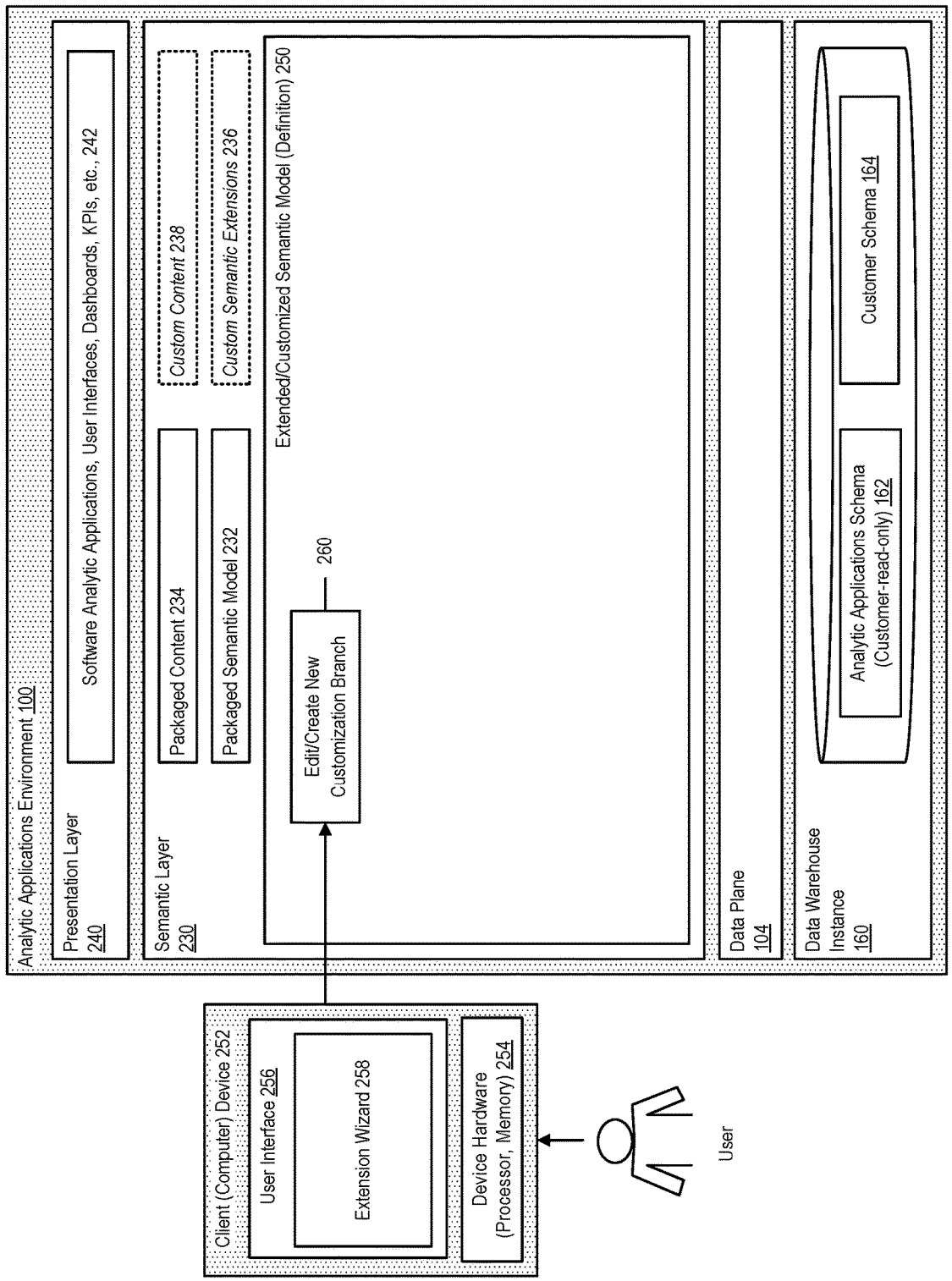
FIG. 12 further illustrates extensibility and customization in an analytic applications environment, in accordance with an embodiment.

FIG. 12 further illustrates extensibility and customization in an analytic applications environment, in accordance with an embodiment.

As illustrated in FIG. 12, in accordance with an embodiment, a user can extend or customize the semantic model 250, using one or more custom semantic extensions, which can then be used by the system to provide custom content to the presentation layer.

For example in accordance with an embodiment, the user can use a client (computer) device 252 having a device hardware 254, and user interface 256, to interact with or otherwise operate an extension wizard 258 or software development component that guides the user through customization and use of a custom semantic extension.

In accordance with an embodiment, a user can edit or create a new customization branch 260, to extend or customize the semantic model. A selection of a branch provides the user with an instance of the semantic model to work with and incorporate their particular customizations or extensions. Each branch operates as an atomic work unit, and can include one or more customization steps associated with customization types and corresponding extensions. The extension wizard can be data-aware and provide a preview of underlying data as the branch is customized. For example, when a user specifies a particular branch to customize, the extension wizard can present a table of example data for the user to review; and thereafter guide the user though customizing, e.g., definitions or aggregations for use with the data. Different types of branches can be associated with different extension wizards.

Figure 13:
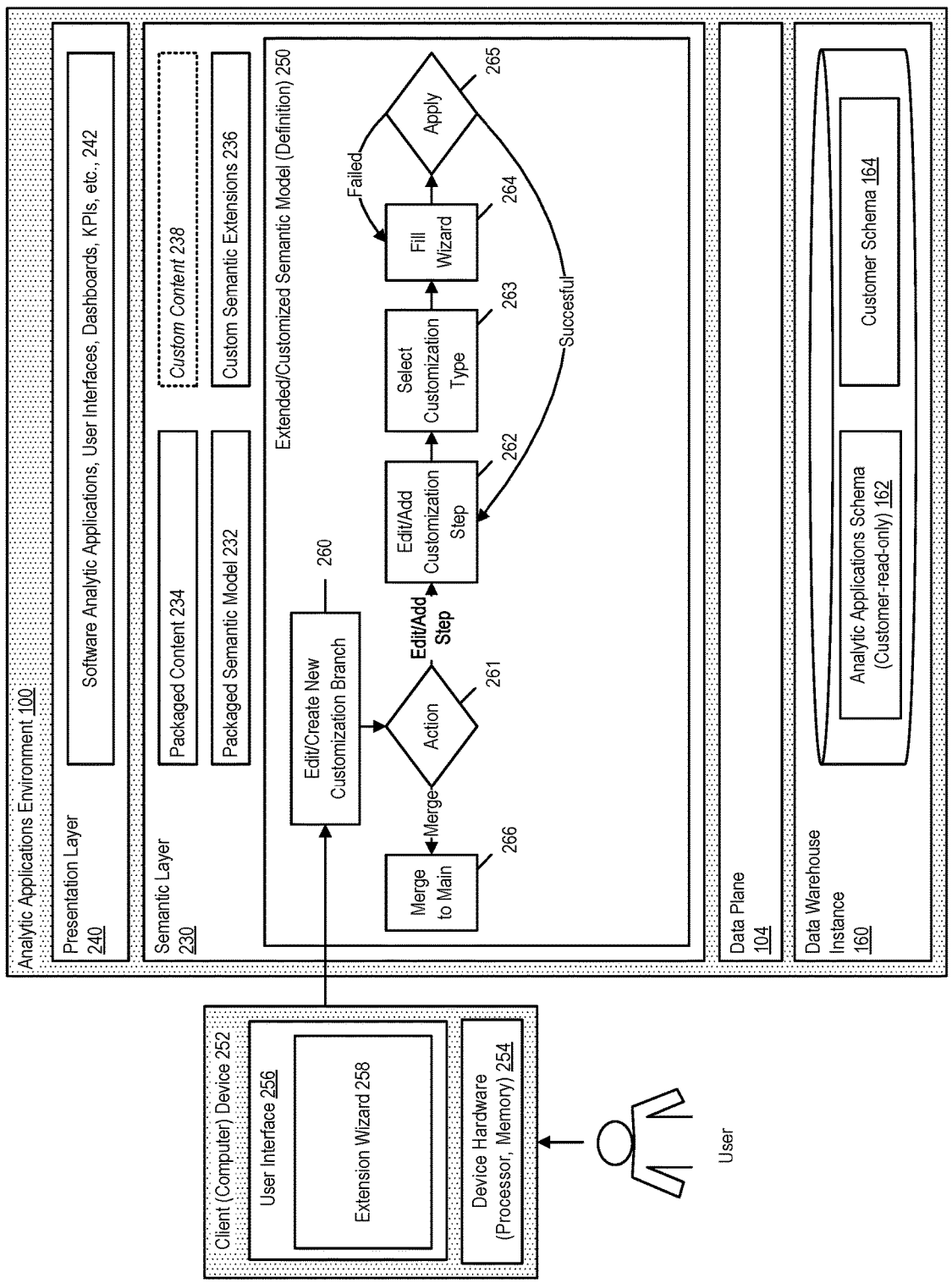
FIG. 13 further illustrates extensibility and customization in an analytic applications environment, in accordance with an embodiment.

FIG. 13 further illustrates extensibility and customization in an analytic applications environment, in accordance with an embodiment.

As illustrated in FIG. 13, in accordance with an embodiment, the extension wizard can guide the user through actions 261 to edit/add one or more customization step 262, select a customization type 263, and complete/fill an appropriate extension wizard 264. At each step, the extension wizard can present the user with one or more wizard screens to review or complete; which may be different depending on the type of extension. Upon successful completion of a step, the user can test their customizations to the branch, add more steps, or apply 265 their changes. The branch as customized can then be merged 266 into the (main) semantic model.

Figure 14:
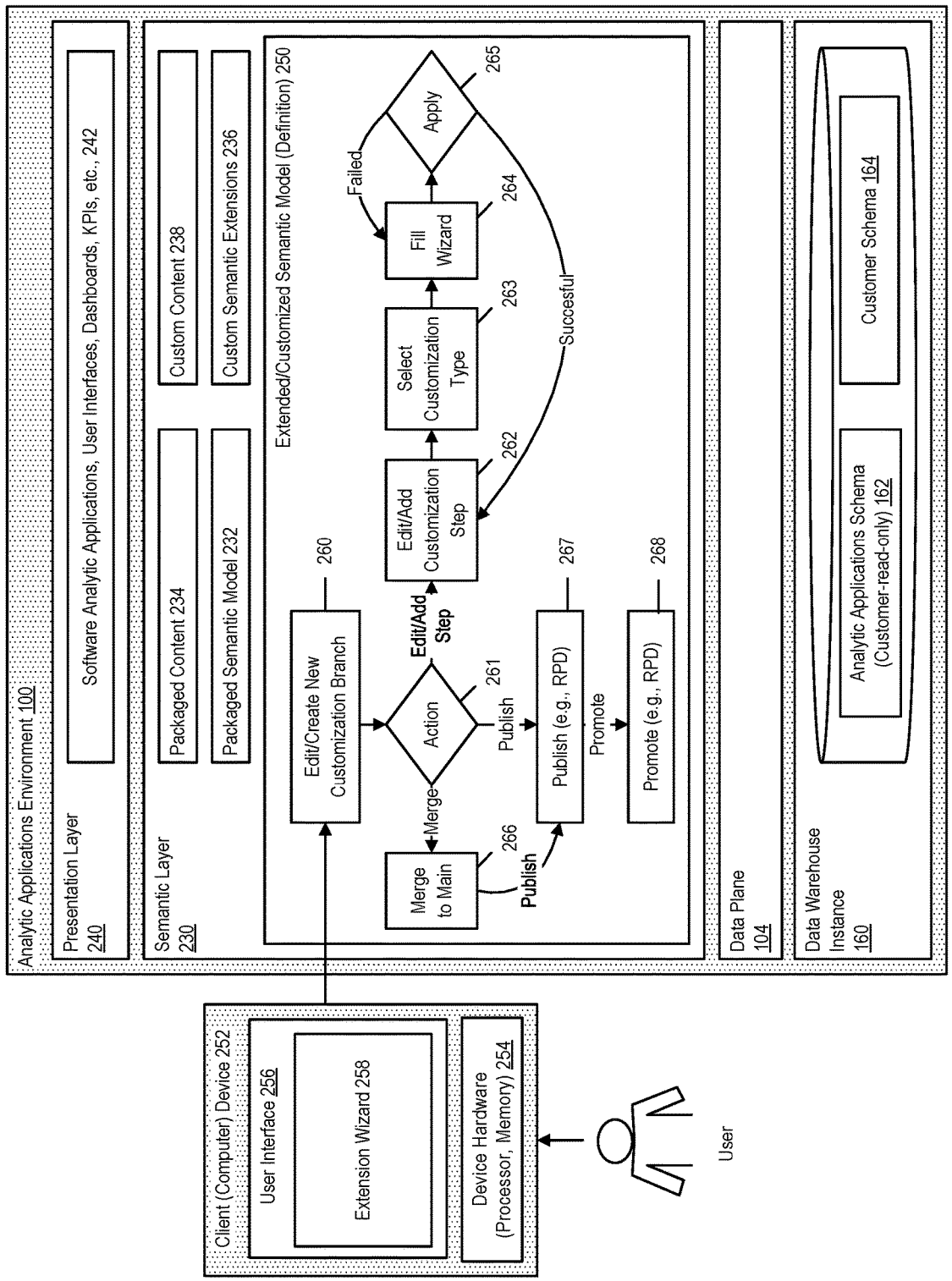
FIG. 14 further illustrates extensibility and customization in an analytic applications environment, in accordance with an embodiment.

FIG. 14 further illustrates extensibility and customization in an analytic applications environment, in accordance with an embodiment.

As illustrated in FIG. 14, in accordance with an embodiment, the system can publish (267) and/or promote (268) changes to the semantic model, for example as an Oracle BI Repository (RPD) file or other type of file or metadata.

Multiple User Development Environment

Within a typical enterprise organization, there may be many users responsible for developing software analytic applications or generating data analytics or business intelligence data. To support this, in accordance with an embodiment, the system enables multiple users to work at the same time to develop extensions or customizations to the semantic model, with changes eventually merged into the (main) semantic model.

Figure 15:
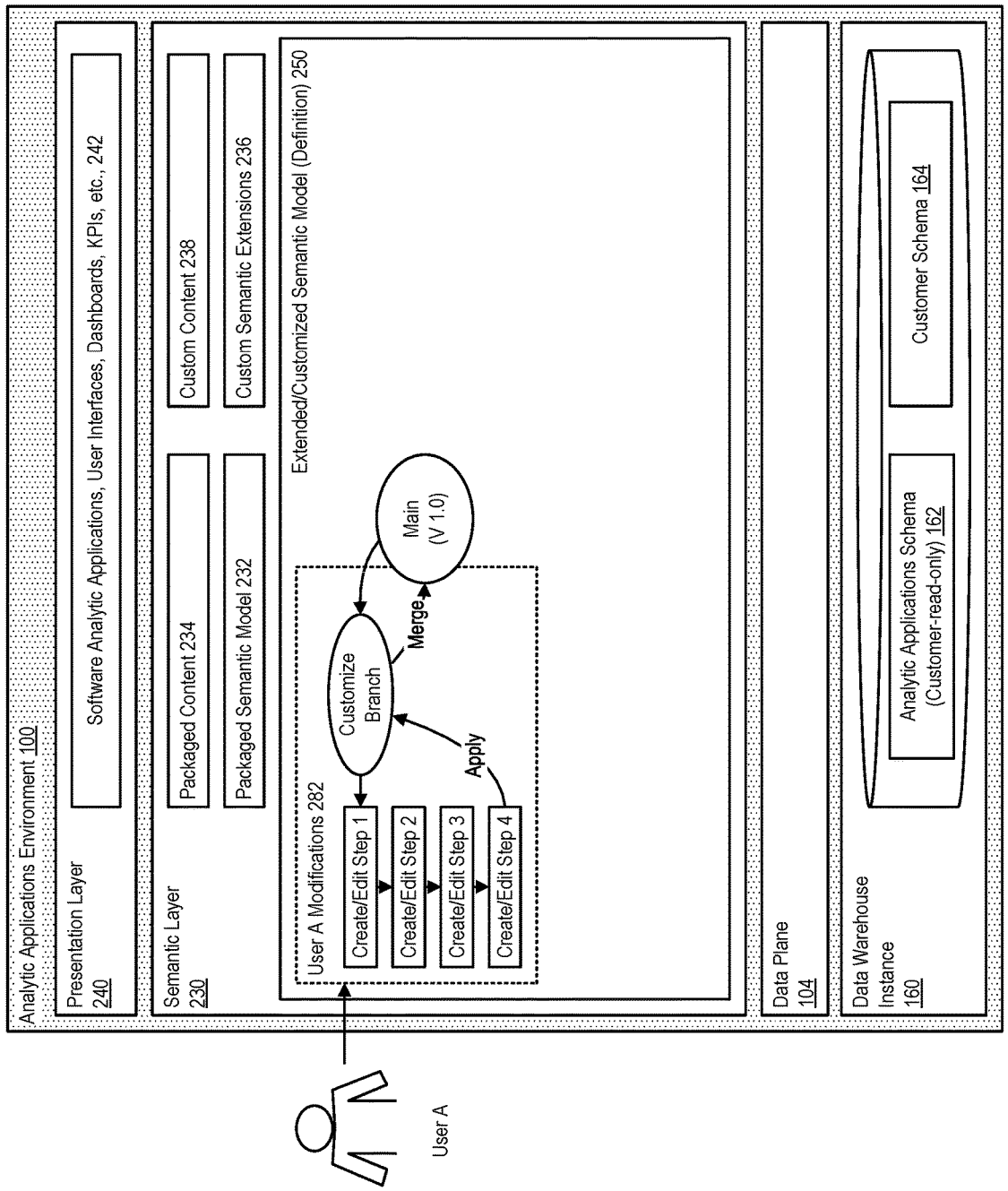
FIG. 15 illustrates support for multiple users in customizing or extending an analytic applications environment, in accordance with an embodiment.

FIG. 15 illustrates support for multiple users in customizing or extending an analytic applications environment, in accordance with an embodiment.

As illustrated in FIG. 15, in accordance with an embodiment, each of a plurality of users A-D can work on an instance of the semantic model, using one or more custom semantic extensions as described above, to provide modifications 284-288 as extensions or customizations to the semantic model.

In accordance with an embodiment, as each user finishes, they can merge their customization into the (main) semantic model. For example, a first user A may wish to create a new branch in connection with customizing a financial application general ledger (GL) profitability, including adding a region dimension (step 1); extending a cost center dimension (step 2); defining a territory hierarchy (step 3); and adding a travel expense calculation (step 4). User A's customization can then be applied and merged into the (main) semantic model.

Figure 16:
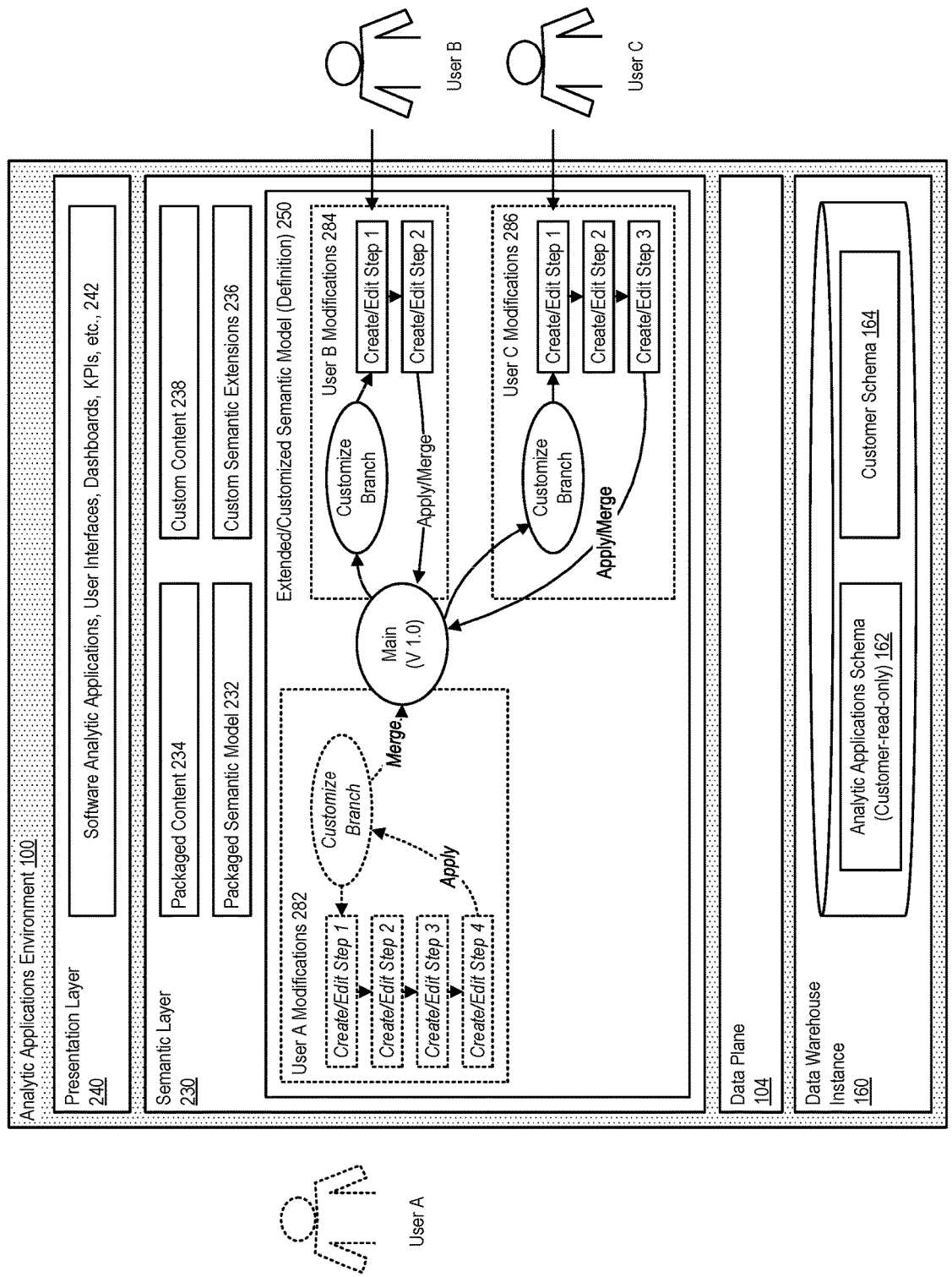
FIG. 16 further illustrates support for multiple users in customizing or extending an analytic applications environment, in accordance with an embodiment.

FIG. 16 further illustrates support for multiple users in customizing or extending an analytic applications environment, in accordance with an embodiment.

As illustrated in FIG. 16, in accordance with an embodiment, a second user B may wish to create a new branch in connection with customizing GL detail transactions, including adding a territory dimension (step 1); and adding an opening amount calculation (step 2); while a third user C may wish to create a new branch in connection with customizing a GL balance sheet, including adding a location dimension (step 1); adding a cash on hand calculation (step 2); and creating a GL aggregates subject area (step 3). The customizations provided by each of users B and C can be similarly applied and merged into the (main) semantic model.

Figure 17:
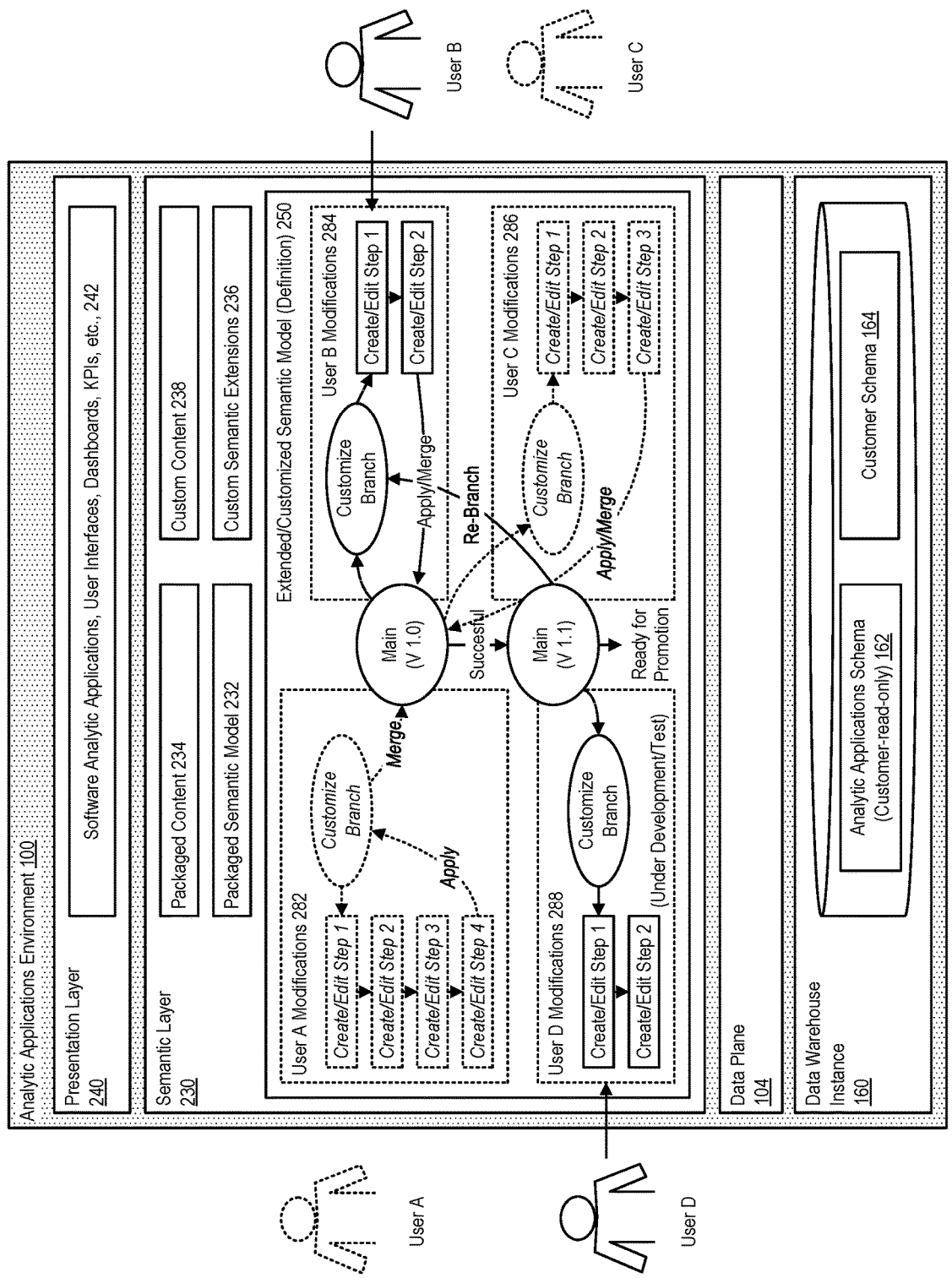
FIG. 17 further illustrates support for multiple users in customizing or extending an analytic applications environment, in accordance with an embodiment.

FIG. 17 further illustrates support for multiple users in customizing or extending an analytic applications environment, in accordance with an embodiment.

As illustrated in FIG. 17, in accordance with an embodiment, the system can support different versions of the semantic model, including determining id changes to the semantic model require a re-branch, or whether the semantic model is ready for promotion to a production environment.

For example, while each of the above users develops customizations to an initial version (v1.0) of the semantic model, a fourth user D may begin work on a new branch, for a new version (v1.1) of the semantic model, including for example adding a strategic supplier dimension (step 1) or extending a region dimension) step 2). The system can also determine whether changes to a particular version of the semantic model require re-branching of a particular set of customizations, such as for example, those provided by user B.

Promotion to Production Environments

In accordance with an embodiment, the system can control definitional changes to the semantic model that are used in creating reports (e.g., a change in the definition of revenue), to ensure accurate generation of business intelligence data.

For example, in accordance with an embodiment, the system can ensure that semantic model extensions are allowed initially only in development/test environments, and are not allowed in production environments until an administrator can review any customized branches and promote those customizations to the production environment in a controlled manner.

Figure 18:
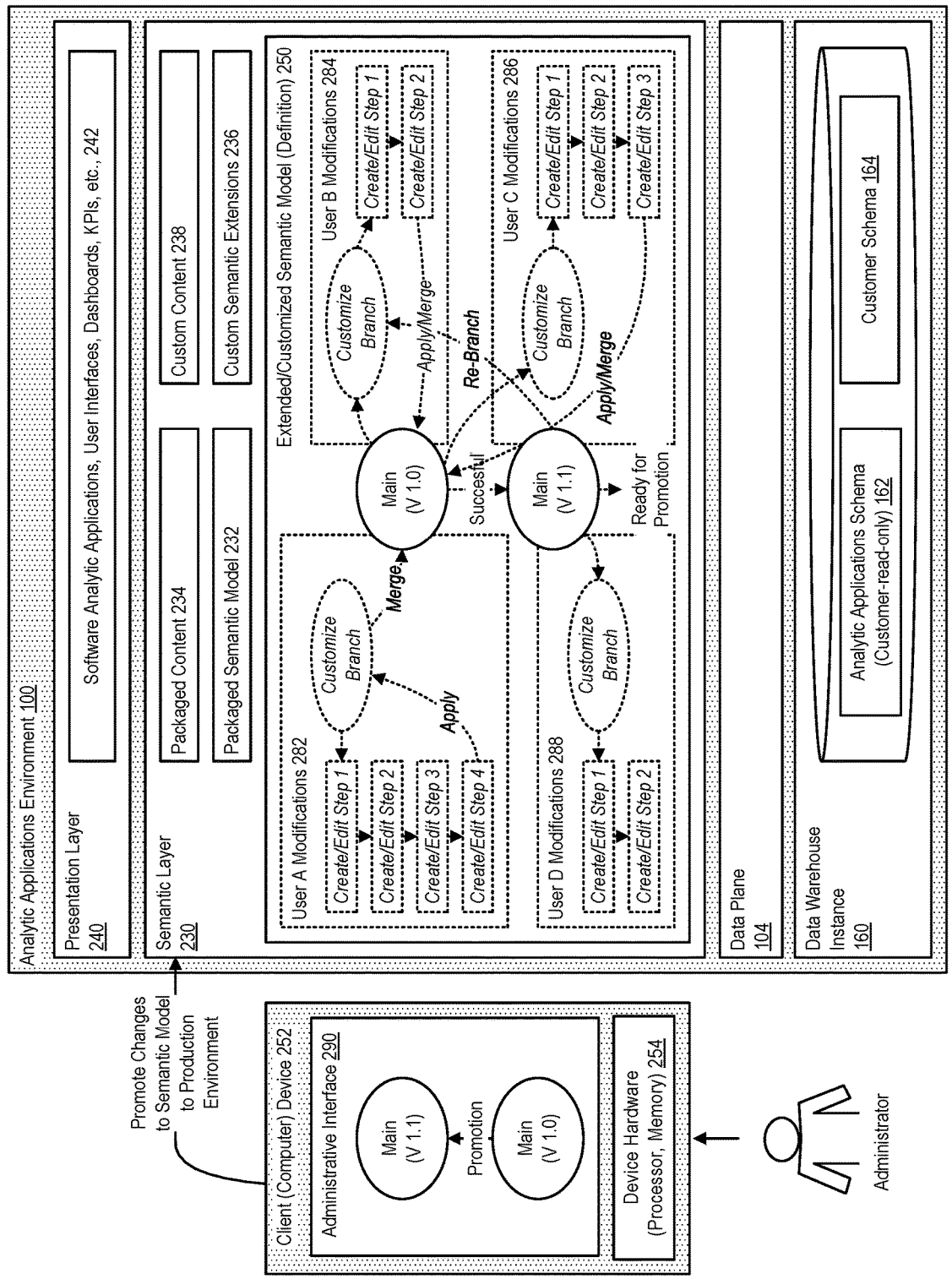
FIG. 18 illustrates promotion of custom semantic extensions in an analytic applications environment, in accordance with an embodiment.

FIG. 18 illustrates promotion of custom semantic extensions in an analytic applications environment, in accordance with an embodiment.

As illustrated in FIG. 18, in accordance with an embodiment, the administrator can use a client (computer) device having an administrator interface 290 to control promotion to a production environment of any user-developed customizations to the semantic model, including for example, reviewing any branches developed by multiple users, and combining or determining a priority of which changes to promote.

Advantages of the described approach include that a user's defined extensions or customizations can endure patches, updates, or other changes to the underlying system. If the immutable aspects of the semantic model are patched or updated; customizations which have been provided as semantic extensions are retained. Following the patch or update, the system can replay the extensions automatically. If an extension fails due to an underlying change to the semantic model, then the administrator can evaluate the changes and walk through possible fixes. Potential conflicts can be gracefully handled, and where it may not be possible to apply all extensions completely, the administrator can be notified accordingly.

Data Layer Extensibility and Customization

In accordance with an embodiment, in addition to data sourced from a customer's environment using the ETL or other data pipelines or processes described above; customer data can be loaded to a data warehouse instance using a variety of data models or scenarios that provide opportunities for further extensibility and customization.

Figure 19:
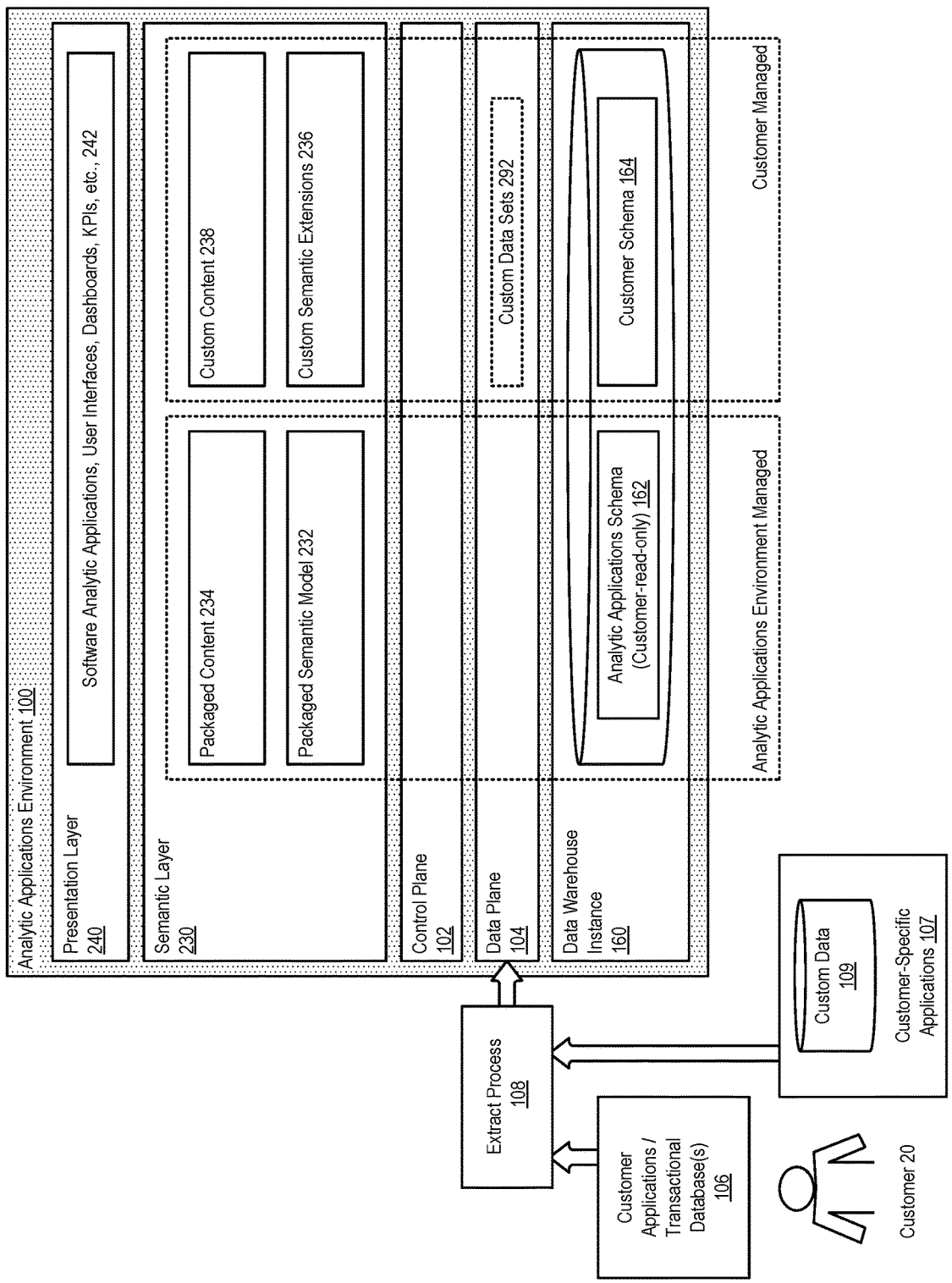
FIG. 19 illustrates a self-service data model, in accordance with an embodiment.

FIG. 19 illustrates a self-service data model, in accordance with an embodiment.

As illustrated in FIG. 19, in accordance with an embodiment, a self-service data model or scenario enables customers to load external or custom data as custom data sets 292, using the ETL or other data pipelines or processes provided by the system, which provides dimensional conformance. A customer can define one or more "live" data sets populated by the system; and join the "live" and external data sets, to create combined data sets that can be queried. In this scenario, customer responsibilities generally include manual refresh of their data sets; and enforcing security of the data sets.

Figure 20:
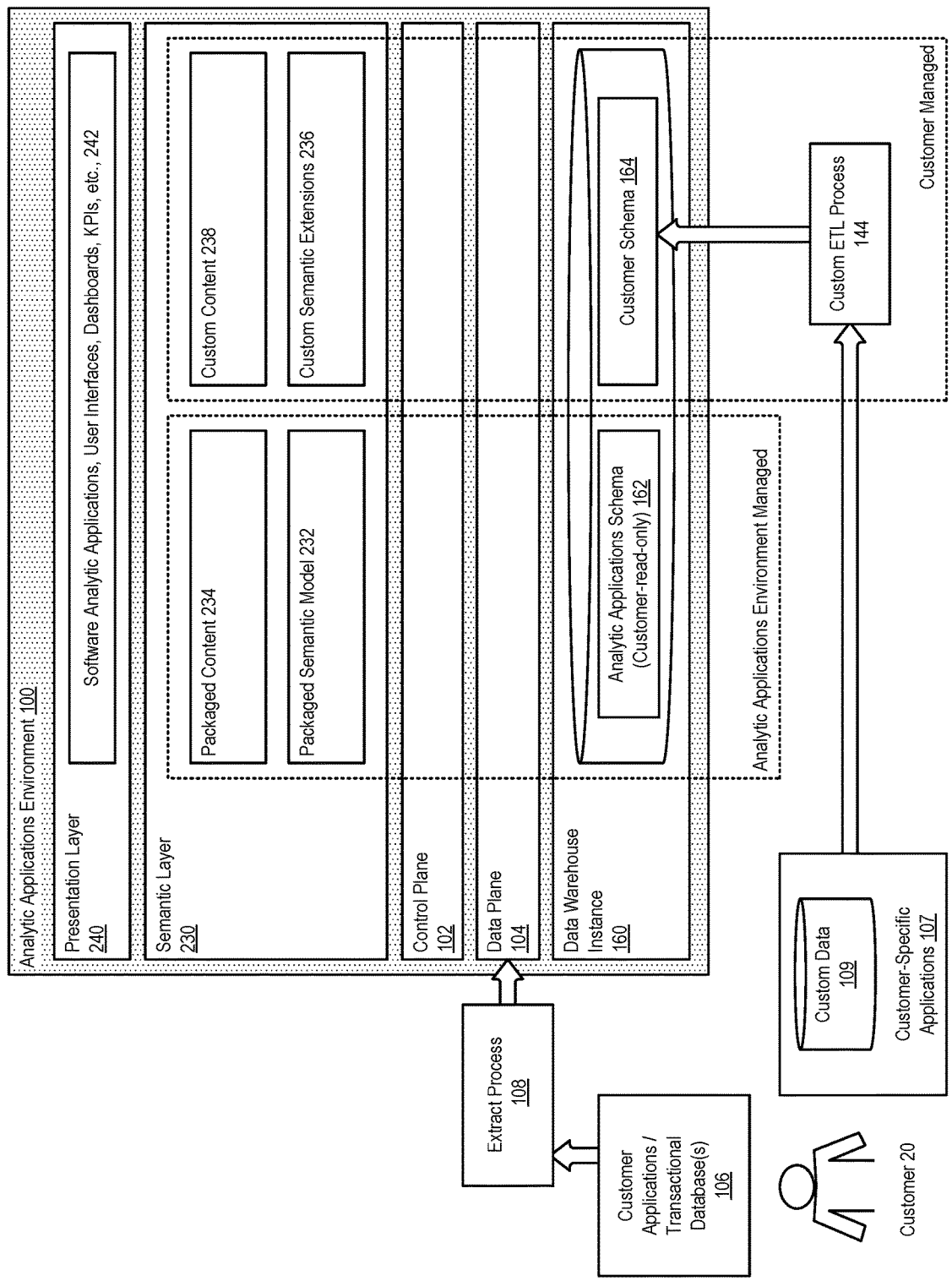
FIG. 20 illustrates a curated data model, in accordance with an embodiment.

FIG. 20 illustrates a curated data model, in accordance with an embodiment.

As illustrated in FIG. 20, in accordance with an embodiment, a curated data model or scenario provides a centralized or managed analytics environment, wherein an ETL or other data pipeline or process provided by the system publishes customer data to the immutable analytic application schema; while the customer onboards external or custom data to their customer schema using a custom ETL (144), or other data pipeline or process. The customer can create business database views combining system-managed and custom tables, and query the combined data using a tool of their choice. In this scenario, customer responsibilities generally include managing the loading and refreshing of data into their customer schema using the custom ETL or other data pipeline or process.

The above examples of curated and self-service data models or scenarios are provided by way of example. In accordance with various embodiments, the system can support other types of data models or scenarios.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing extensibility and customization in an analytic applications environment, comprising:
    a computer including one or more processors, that provides access by an analytic applications environment to a data warehouse for storage of data by a plurality of tenants;
    wherein each tenant of the plurality of tenants is associated with a customer tenancy, and with a tenant-specific customer schema maintained within their customer tenancy, for use in populating a data warehouse instance;
    wherein the system performs an extract, transform, load or other data pipeline or process as defined by a combination of an analytic applications schema shared by the plurality of tenants and the tenant-specific customer schema associated with a tenant, to receive data from the tenant's enterprise software application or data environment, for loading into a data warehouse instance, and populate the data warehouse instance with the data received from the tenant's enterprise software application or data environment as defined by the combination of the analytic applications schema and the tenant-specific customer schema; and
    a semantic layer that enables use of custom semantic extensions to extend a packaged semantic model, and provides custom content at a presentation layer, wherein the semantic layer includes:
        an initial version of a semantic model usable to provide a packaged content, to access the data loaded from the tenant's enterprise software application or data environment, as defined by the combination of the analytic applications schema and the tenant-specific customer schema, into their data warehouse instance, and provide a packaged content to the presentation layer; and
        one or more semantic extensions that when merged with the initial version of the semantic model, operate to modify operation of the semantic model and provide a custom content to the presentation layer, wherein each of a plurality of users are provided with an instance of the semantic model to provide modifications as extensions or customizations thereto as a separate branch, wherein the extensions or customizations provided by the plurality of users are then merged into the semantic model;
    wherein the custom content is customized on a per tenant basis, for different tenants of the plurality of tenants, as determined by the semantic model including the extensions or customizations thereto;
    wherein the presentation layer provides access to data in the data warehouse instance for each of the different tenants using the tenant's custom content at the presentation layer;
    wherein an extension wizard provides instructions indicative of guided steps through customization and use of the custom semantic extensions and enables the user to edit or create a customization branch to extend or customize the semantic model, wherein selection of the branch provides the user with an instance of the semantic model to work with and incorporate their particular customizations or extensions, which customizations or extensions can then be promoted to a production environment;
    wherein in response to immutable aspects of the semantic model being patched or updated, customizations provided as the custom semantic extensions are retained and automatically applied following the patch or update.

2. The system of claim 1, wherein customizations or extensions developed by the multiple users can then be promoted to a production environment.

3. The system of claim 1, wherein the analytic applications environment is provided within a cloud environment, and the semantic layer includes a physical layer that maps to a physical data model or data plane, a logical layer that operates as a mapping or transformation layer where calculations are defined.

4. The system of claim 1, wherein the branch operates as an atomic work unit and includes one or more customization steps associated with customization types and corresponding extensions, and wherein the extension wizard is data-aware and provides a preview of underlying data as the branch is customized.

5. The system of claim 1, wherein the customization branch is merged into the semantic model and wherein the semantic terms are business terms.

6. The system of claim 1, wherein the extension wizard is configured to guide users in using the custom semantic extensions to extend or customize the semantic model through a definition of branches and steps, wherein different types of branches are associated with different extension wizards, and different versions of the semantic model are supported.

7. The system of claim 1, wherein in response to a user specifying the branch to customize, the extension wizard presents a table of example data to a user and thereafter guides the user though customizing definitions or aggregations for use with the data.

8. The system of claim 1, wherein the analytic applications environment provides:
    for a first tenant of the plurality of tenants, a first tenant-specific customer schema maintained within a first customer tenancy; and
    for a second tenant of the plurality of tenants, a second tenant-specific customer schema maintained within a second customer tenancy;
    wherein each tenant's resultant data warehouse instance contents are:
        partly-controlled by their customer schema; and
        partly-controlled by the analytic applications schema in pre-populating their data warehouse instance with data retrieved from the tenant's enterprise software application or data environment.

9. A method for providing extensibility and customization in an analytic applications environment, comprising:

providing, at a computer including one or more processors, an analytic applications environment that provides access by an analytic applications environment to a data warehouse for storage of data by a plurality of tenants;

wherein each tenant of the plurality of tenants is associated with a customer tenancy, and with a tenant-specific customer schema maintained within their customer tenancy, for use in populating a data warehouse instance;

wherein the system performs an extract, transform, load or other data pipeline or process as defined by a combination of an analytic applications schema shared by the plurality of tenants and the tenant-specific customer schema associated with a tenant, to receive data from the tenant's enterprise software application or data environment, for loading into a data warehouse instance, and populate the data warehouse instance with the data received from the tenant's enterprise software application or data environment as defined by the combination of the analytic applications schema and the tenant-specific customer schema; and providing a semantic layer that enables use of custom semantic extensions to extend a packaged semantic model, and provide custom content at a presentation layer, wherein the semantic layer includes:

an initial version of a semantic model usable to provide a packaged content, to access the data loaded from the tenant's enterprise software application or data environment, as defined by the combination of the analytic applications schema and the tenant-specific customer schema, into their data warehouse instance, and provide a packaged content to the presentation layer; and one or more semantic extensions that when merged with the initial semantic model, operate to modify operation of the semantic model and provide a custom content to the presentation layer, wherein each of a plurality of users are provided with an instance of the semantic model to provide modifications as extensions or customizations thereto as a separate branch, wherein the extensions or customizations provided by the plurality of users are then merged into the semantic model;

wherein the custom content is customized on a per tenant basis, for different tenants of the plurality of tenants, as determined by the semantic model including the extensions or customizations thereto;

wherein the presentation layer provides access to data in the data warehouse instance for each of the different tenants using the tenant's custom content at the presentation layer;

wherein an extension wizard provides instructions indicative of guided steps through customization and use of the custom semantic extensions and enables the user to edit or create a customization branch to extend or customize the semantic model, wherein selection of the branch provides the user with an instance of the semantic model to work with and incorporate their particular customizations or extensions, which customizations or extensions can then be promoted to a production environment;

wherein in response to immutable aspects of the semantic model being patched or updated, customizations provided as the custom semantic extensions are retained and automatically applied following the patch or update.

10. The method of claim 9, wherein the analytic applications environment is provided within a cloud environment.

11. The method of claim 9, wherein the analytic applications environment provides:

for a first tenant of the plurality of tenants, a first tenant-specific customer schema maintained within a first customer tenancy; and for a second tenant of the plurality of tenants, a second tenant-specific customer schema maintained within a second customer tenancy;

wherein each tenant's resultant data warehouse instance contents are:

partly-controlled by their customer schema; and partly-controlled by the analytic applications schema in pre-populating their data warehouse instance with data retrieved from the tenant's enterprise software application or data environment.

12. A non-transitory computer readable storage medium having instructions thereon, which when read and executed by a computer including one or more processors cause the computer to perform a method comprising:

providing, at a computer including one or more processors, an analytic applications environment that provides access by an analytic applications environment to a data warehouse for storage of data by a plurality of tenants;

wherein each tenant of the plurality of tenants is associated with a customer tenancy, and with a tenant-specific customer schema maintained within their customer tenancy, for use in populating a data warehouse instance;

wherein the system performs an extract, transform, load or other data pipeline or process as defined by a combination of an analytic applications schema shared by the plurality of tenants and the tenant-specific customer schema associated with a tenant, to receive data from the tenant's enterprise software application or data environment, for loading into a data warehouse instance, and populate the data warehouse instance with the data received from the tenant's enterprise software application or data environment as defined by the combination of the analytic applications schema and the tenant-specific customer schema; and providing a semantic layer that enables use of custom semantic extensions to extend a packaged semantic model, and provide custom content at a presentation layer, wherein the semantic layer includes:

an initial version of a semantic model usable to provide a packaged content, to access the data loaded from the tenant's enterprise software application or data environment, as defined by the combination of the analytic applications schema and the tenant-specific customer schema, into their data warehouse instance, and provide a packaged content to the presentation layer; and one or more semantic extensions that when merged with the initial semantic model, operate to modify operation of the semantic model and provide a custom content to the presentation layer, wherein each of a plurality of users are provided with an instance of the semantic model to provide modifications as extensions or customizations thereto as a separate branch, wherein the extensions or customizations provided by the plurality of users are then merged into the semantic model;

wherein the custom content is customized on a per tenant basis, for different tenants of the plurality of tenants, as determined by the semantic model including the extensions or customizations thereto;

wherein the presentation layer provides access to data in the data warehouse instance for each of the different tenants using the tenant's custom content at the presentation layer;

wherein an extension wizard provides instructions indicative of guided steps through customization and use of the custom semantic extensions and enables the user to edit or create a customization branch to extend or customize the semantic model, wherein selection of the branch provides the user with an instance of the semantic model to work with and incorporate their particular customizations or extensions, which customizations or extensions can then be promoted to a production environment;

wherein in response to immutable aspects of the semantic model being patched or updated, customizations provided as the custom semantic extensions are retained and automatically applied following the patch or update.

13. The non-transitory computer readable storage medium of claim 12, wherein the analytic applications environment is provided within a cloud environment.

* * * * *